(12) United States Patent
Pederson et al.

(10) Patent No.: US 8,886,045 B2
(45) Date of Patent: *Nov. 11, 2014

(54) LED LIGHT BROAD BAND OVER POWER LINE COMMUNICATION SYSTEM

(71) Applicant: Federal Law Enforcement Development Services, Inc., St. Cloud, MN (US)

(72) Inventors: John C. Pederson, St. Cloud, MN (US); Paul R. Brown, Louisville, KY (US); Timothy J. Vogt, Sartell, MN (US); James LeClaire, Oakdale, MN (US); James Zimmerman, Big Lake, MN (US); Brent Mikkelsen, Hartford, WI (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,759

(22) Filed: Oct. 10, 2013

(65) Prior Publication Data

US 2014/0037295 A1 Feb. 6, 2014

Related U.S. Application Data

(63) Continuation of application No. 13/426,962, filed on Mar. 22, 2012, now Pat. No. 8,571,411, which is a (Continued)

(51) Int. Cl.
*H04B 10/00* (2013.01)
*H04B 10/04* (2006.01)

(Continued)

(52) U.S. Cl.
CPC ............ *H04B 10/00* (2013.01); *H04B 10/1149* (2013.01); *H04B 10/1143* (2013.01); *H05B 37/0272* (2013.01); *H04B 10/116* (2013.01)
USPC ........... 398/115; 398/183; 398/172; 398/118; 398/130; 398/96; 315/312; 315/318

(58) Field of Classification Search
CPC . H04B 10/00; H04B 10/1143; H04B 10/1149
USPC ........... 398/115, 96, 103, 118, 130, 183, 172
See application file for complete search history.

(56) References Cited

U.S. PATENT DOCUMENTS 700,678 A 5/1902 Downie
2,082,279 A 6/1937 Fore (Continued)

FOREIGN PATENT DOCUMENTS

AU 2006201345 10/2007
AU 2007202909 2/2008

(Continued)

OTHER PUBLICATIONS

T. Komine and M. Nakagawa, Integrated System of White LED Visible-Light Communication and Power-Line Communication Integrated System of White LED Visible-Light Communication and Power-Line Communication Toshihiko Komine, Student Member, IEEE and Masao Nakagawa, Member, IEEE Date Feb. 1, 2003.*

(Continued)

*Primary Examiner* — Ken Vanderpuye
*Assistant Examiner* — Abbas H Alagheband
(74) *Attorney, Agent, or Firm* — Vidas, Arrett & Steinkraus, P.A.

(57) ABSTRACT

An LED light and communication system is in communication with a broadband over power line communications system. The LED light and communication system includes at least one optical transceiver. The optical transceiver includes a light support having a plurality of light emitting diodes and at least one photodetector attached thereto, and a processor. The processor is in communication with the light emitting diodes and the at least one photodetector. The processor is constructed and arranged to generate a communication signal.

21 Claims, 17 Drawing Sheets

Related U.S. Application Data continuation of application No. 12/126,469, filed on May 23, 2008, now abandoned.

(60) Provisional application No. 60/931,611, filed on May 24, 2007.

(51) Int. Cl.
| | |
|---|---|
| *H04J 14/02* | (2006.01) |
| *H05B 37/00* | (2006.01) |
| *H04B 10/114* | (2013.01) |
| *H05B 37/02* | (2006.01) |
| *H04B 10/116* | (2013.01) |

(56) References Cited

U.S. PATENT DOCUMENTS

| | | |
|---|---|---|
| 3,469,686 A | 9/1969 | Gutsche et al. |
| 3,701,043 A | 10/1972 | Zuleeg et al. |
| 3,705,316 A | 12/1972 | Burrous et al. |
| 3,863,075 A | 1/1975 | Ironmonger et al. |
| 3,867,718 A | 2/1975 | Moe |
| 3,889,147 A | 6/1975 | Groves |
| 3,911,430 A | 10/1975 | Jankowski et al. |
| 4,149,111 A | 4/1979 | Coates, Jr. |
| 4,243,985 A | 1/1981 | Quayle |
| 4,254,453 A | 3/1981 | Mouyard |
| 4,271,408 A | 6/1981 | Teshima |
| 4,298,806 A | 11/1981 | Herold |
| 4,301,461 A | 11/1981 | Asano |
| 4,319,306 A | 3/1982 | Stanuch |
| 4,336,580 A | 6/1982 | Mouyard |
| 4,342,944 A | 8/1982 | SpringThorpe |
| 4,368,979 A | 1/1983 | Ruell |
| 4,390,931 A | 6/1983 | Gorick |
| 4,434,510 A | 2/1984 | Lemelson |
| 4,445,132 A | 4/1984 | Ichikawa |
| 4,556,862 A | 12/1985 | Meinershagen |
| 4,595,904 A | 6/1986 | Gosswiller |
| 4,598,198 A | 7/1986 | Fayfield |
| 4,614,866 A | 9/1986 | Liss |
| 4,615,131 A | 10/1986 | Wakatake |
| 4,616,225 A | 10/1986 | Woudenberg |
| 4,630,180 A | 12/1986 | Muraki |
| 4,630,183 A | 12/1986 | Fujita |
| 4,633,280 A | 12/1986 | Takasu |
| 4,654,629 A | 3/1987 | Bezos |
| 4,703,219 A | 10/1987 | Mesquida |
| 4,710,977 A | 12/1987 | Lemelson |
| 4,716,296 A | 12/1987 | Bussiere |
| 4,720,835 A | 1/1988 | Akiba |
| 4,724,312 A | 2/1988 | Snaper |
| 4,742,432 A | 5/1988 | Thillays |
| 4,799,135 A | 1/1989 | Inukai |
| 4,821,118 A | 4/1989 | Lafreniere |
| 4,821,338 A | 4/1989 | Naruse |
| 4,868,719 A | 9/1989 | Kouchi |
| 4,900,970 A | 2/1990 | Ando |
| 4,918,497 A | 4/1990 | Edmond |
| 4,928,084 A | 5/1990 | Reiser |
| 4,929,866 A | 5/1990 | Murata |
| 4,935,665 A | 6/1990 | Murata |
| 4,949,866 A | 8/1990 | Sanders |
| 4,954,822 A | 9/1990 | Borenstein |
| 4,965,644 A | 10/1990 | Kawabata |
| 4,966,862 A | 10/1990 | Edmond |
| 4,975,644 A | 12/1990 | Fox |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton |
| 5,041,947 A | 8/1991 | Yuen |
| 5,045,767 A | 9/1991 | Wakatake |
| 5,050,055 A | 9/1991 | Lindsay |
| 5,057,828 A | 10/1991 | Rousseau |
| 5,060,303 A | 10/1991 | Wilmoth |
| 5,062,152 A | 10/1991 | Faulkner |
| 5,067,788 A | 11/1991 | Jannson |
| 5,091,828 A | 2/1992 | Jincks |
| D324,921 S | 3/1992 | Stanuch |
| 5,093,768 A | 3/1992 | Ohe |
| 5,097,397 A | 3/1992 | Stanuch |
| 5,097,612 A | 3/1992 | Williams |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk |
| 5,172,113 A | 12/1992 | Hamer |
| 5,182,647 A | 1/1993 | Chang |
| 5,187,547 A | 2/1993 | Niina |
| 5,193,201 A | 3/1993 | Tymes |
| 5,198,746 A | 3/1993 | Gyugyi |
| 5,198,756 A | 3/1993 | Jenkins |
| 5,220,235 A | 6/1993 | Wakimizu |
| 5,224,773 A | 7/1993 | Arimura |
| 5,233,204 A | 8/1993 | Fletcher |
| 5,235,498 A | 8/1993 | VanDulmen |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert |
| 5,302,965 A | 4/1994 | Belcher |
| 5,313,187 A | 5/1994 | Choi |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai |
| 5,359,669 A | 10/1994 | Shanley |
| 5,361,190 A | 11/1994 | Roberts |
| 5,362,971 A | 11/1994 | McMahon |
| 5,381,155 A | 1/1995 | Gerber |
| 5,400,140 A | 3/1995 | Johnston |
| 5,401,328 A | 3/1995 | Schmitz |
| 5,403,916 A | 4/1995 | Watanabe |
| 5,406,095 A | 4/1995 | Koyama |
| 5,410,328 A | 4/1995 | Yoksza |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase |
| 5,422,623 A | 6/1995 | Bader |
| 5,426,417 A | 6/1995 | Stanuch |
| 5,434,693 A | 7/1995 | Tanaka |
| 5,436,809 A | 7/1995 | Brassier |
| 5,450,301 A | 9/1995 | Waltz |
| 5,453,729 A | 9/1995 | Chu |
| 5,465,142 A | 11/1995 | Krumes |
| 5,471,371 A | 11/1995 | Koppolu |
| 5,475,241 A | 12/1995 | Harrah |
| 5,482,896 A | 1/1996 | Tang |
| 5,490,048 A | 2/1996 | Brassier |
| 5,490,049 A | 2/1996 | Montalan |
| 5,491,350 A | 2/1996 | Unno |
| 5,498,883 A | 3/1996 | Lebby |
| 5,514,627 A | 5/1996 | Lowery |
| 5,516,727 A | 5/1996 | Broom |
| 5,519,720 A | 5/1996 | Hirano |
| 5,526,237 A | 6/1996 | Davenport |
| 5,528,474 A | 6/1996 | Roney |
| 5,532,472 A | 7/1996 | Furuta |
| 5,546,219 A | 8/1996 | Iida |
| 5,546,496 A | 8/1996 | Kimoto |
| 5,552,780 A | 9/1996 | Knockeart |
| 5,557,257 A | 9/1996 | Gieffers |
| 5,567,036 A | 10/1996 | Theobald |
| 5,568,406 A | 10/1996 | Gerber |
| 5,569,939 A | 10/1996 | Choi |
| 5,575,459 A | 11/1996 | Anderson |
| 5,580,156 A | 12/1996 | Suzuki |
| 5,585,783 A | 12/1996 | Hall |
| 5,593,223 A | 1/1997 | Koizumi |

(56) References Cited

U.S. PATENT DOCUMENTS

| | | | |
|---|---|---|---|
| 5,593,459 A | 1/1997 | Gamblin |
| 5,594,415 A | 1/1997 | Ishikawa |
| 5,598,290 A | 1/1997 | Tanaka |
| 5,604,480 A | 2/1997 | Lamparter |
| 5,606,444 A | 2/1997 | Johnson |
| 5,607,788 A | 3/1997 | Tomazic |
| 5,612,201 A | 3/1997 | DePlaen |
| 5,612,231 A | 3/1997 | Holm |
| 5,625,201 A | 4/1997 | Holm |
| 5,627,851 A | 5/1997 | Takahashi |
| 5,631,474 A | 5/1997 | Saitoh |
| 5,632,551 A | 5/1997 | Roney |
| 5,633,629 A | 5/1997 | Hochstein |
| 5,634,287 A | 6/1997 | Lamparter |
| 5,634,357 A | 6/1997 | Nutter |
| 5,634,711 A | 6/1997 | Kennedy |
| 5,635,902 A | 6/1997 | Hochstein |
| 5,635,981 A | 6/1997 | Ribacoff |
| 5,636,916 A | 6/1997 | Sokolowski |
| 5,643,357 A | 7/1997 | Breton |
| 5,644,291 A | 7/1997 | Jozwik |
| 5,656,829 A | 8/1997 | Sakaguchi |
| 5,660,461 A | 8/1997 | Ignatius |
| 5,661,645 A | 8/1997 | Hochstein |
| 5,661,742 A | 8/1997 | Huang |
| 5,664,448 A | 9/1997 | Swan |
| 5,674,000 A | 10/1997 | Kalley |
| 5,694,112 A | 12/1997 | VannRox |
| 5,696,500 A | 12/1997 | Diem |
| 5,697,175 A | 12/1997 | Schwartz |
| 5,705,047 A | 1/1998 | Lee |
| 5,707,891 A | 1/1998 | Izumi |
| 5,708,428 A | 1/1998 | Phillips |
| 5,722,760 A | 3/1998 | Chien |
| 5,726,535 A | 3/1998 | Yan |
| 5,726,786 A | 3/1998 | Heflinger |
| 5,734,337 A | 3/1998 | Kupersmit |
| 5,734,343 A | 3/1998 | Urbish |
| 5,736,925 A | 4/1998 | Knauff |
| 5,739,552 A | 4/1998 | Kimura |
| 5,739,592 A | 4/1998 | Rigsby |
| 5,758,947 A | 6/1998 | Glatt |
| 5,760,531 A | 6/1998 | Pederson |
| 5,781,105 A | 7/1998 | Bitar |
| 5,785,418 A | 7/1998 | Hochstein |
| 5,786,918 A | 7/1998 | Suzuki |
| 5,789,768 A | 8/1998 | Lee |
| 5,793,062 A | 8/1998 | Kish, Jr. |
| 5,796,376 A | 8/1998 | Banks |
| 5,804,822 A | 9/1998 | Brass |
| 5,805,081 A | 9/1998 | Fikacek |
| 5,805,209 A | 9/1998 | Yuge |
| 5,806,965 A | 9/1998 | Deese |
| 5,808,592 A | 9/1998 | Mizutani |
| 5,809,161 A | 9/1998 | Auty |
| 5,809,681 A | 9/1998 | Miyamoto |
| 5,810,833 A | 9/1998 | Brady |
| 5,818,421 A | 10/1998 | Ogino |
| 5,826,965 A | 10/1998 | Lyons |
| 5,828,055 A | 10/1998 | Jebens |
| 5,831,155 A | 11/1998 | Hewitt |
| 5,838,024 A | 11/1998 | Masuda |
| 5,838,116 A * | 11/1998 | Katyl et al. ................ 315/307 |
| 5,838,247 A | 11/1998 | Bladowski |
| 5,838,259 A | 11/1998 | Tonkin |
| 5,848,837 A | 12/1998 | Gustafson |
| 5,860,135 A | 1/1999 | Sugita |
| 5,872,646 A | 2/1999 | Alderman |
| 5,875,261 A | 2/1999 | Fitzpatrick |
| 5,884,997 A | 3/1999 | Stanuch |
| 5,898,381 A | 4/1999 | Gartner |
| 5,900,850 A | 5/1999 | Bailey |
| 5,917,637 A | 6/1999 | Ishikawa |
| 5,929,788 A | 7/1999 | Vukosic |
| 5,931,562 A | 8/1999 | Arato |
| 5,931,570 A | 8/1999 | Yamuro |
| 5,932,860 A | 8/1999 | Plesko |
| 5,934,694 A | 8/1999 | Schugt |
| 5,936,417 A | 8/1999 | Nagata |
| 5,939,996 A | 8/1999 | Kniveton |
| 5,948,038 A | 9/1999 | Daly |
| 5,959,752 A | 9/1999 | Ota |
| 5,960,135 A | 9/1999 | Ozawa |
| 5,965,879 A | 10/1999 | Leviton |
| 5,966,073 A | 10/1999 | Walton |
| 5,975,714 A | 11/1999 | Vetorino |
| 5,990,802 A | 11/1999 | Maskeny |
| 5,991,085 A | 11/1999 | Rallison |
| 6,009,650 A | 1/2000 | Lamparter |
| 6,014,237 A | 1/2000 | Abeles |
| 6,018,899 A | 2/2000 | Hanitz |
| 6,028,694 A | 2/2000 | Schmidt |
| 6,035,053 A | 3/2000 | Yoshioka |
| 6,035,055 A | 3/2000 | Wang |
| 6,035,074 A | 3/2000 | Fujimoto |
| 6,067,010 A | 5/2000 | Wang |
| 6,067,011 A | 5/2000 | Leslie |
| 6,067,018 A | 5/2000 | Skelton |
| 6,072,893 A | 6/2000 | Luo |
| 6,081,206 A | 6/2000 | Kielland |
| 6,081,304 A | 6/2000 | Kuriyama |
| 6,086,229 A | 7/2000 | Pastrick |
| 6,091,025 A | 7/2000 | Cotter |
| 6,094,148 A | 7/2000 | Henry |
| 6,095,661 A | 8/2000 | Lebens |
| 6,095,663 A | 8/2000 | Pond |
| 6,102,696 A | 8/2000 | Osterwalder |
| 6,106,137 A | 8/2000 | Adams |
| 6,111,671 A | 8/2000 | Bahuguna |
| 6,118,388 A | 9/2000 | Morrison |
| 6,121,898 A | 9/2000 | Moetteli |
| 6,126,087 A | 10/2000 | Hedger |
| 6,159,005 A | 12/2000 | Herold |
| 6,166,496 A | 12/2000 | Lys |
| 6,177,678 B1 | 1/2001 | Brass |
| 6,183,100 B1 | 2/2001 | Suckow |
| 6,188,738 B1 * | 2/2001 | Sakamoto et al. ............ 375/371 |
| 6,243,492 B1 | 6/2001 | Kamei |
| 6,249,340 B1 | 6/2001 | Jung |
| 6,268,788 B1 | 7/2001 | Gray |
| 6,271,814 B1 | 8/2001 | Kaoh |
| 6,271,815 B1 * | 8/2001 | Yang et al. ................ 345/82 |
| 6,271,913 B1 | 8/2001 | Jung |
| 6,292,575 B1 | 9/2001 | Bortolussi |
| 6,293,904 B1 | 9/2001 | Blazey |
| 6,318,886 B1 | 11/2001 | Stopa |
| 6,352,358 B1 | 3/2002 | Lieberman |
| 6,367,949 B1 | 4/2002 | Pederson |
| 6,369,849 B1 | 4/2002 | Rzyski |
| 6,377,558 B1 | 4/2002 | Dent |
| 6,380,865 B1 | 4/2002 | Pederson |
| 6,389,115 B1 | 5/2002 | Swistock |
| 6,389,155 B2 | 5/2002 | Funayama |
| 6,396,954 B1 | 5/2002 | Kondo |
| 6,400,828 B2 | 6/2002 | Covell |
| 6,411,022 B1 | 6/2002 | Machida |
| 6,424,269 B1 | 7/2002 | Pederson |
| 6,426,599 B1 * | 7/2002 | Leeb ..................... 315/224 |
| 6,461,008 B1 | 10/2002 | Pederson |
| 6,462,669 B1 | 10/2002 | Pederson |
| 6,469,631 B1 | 10/2002 | Pederson |
| 6,472,996 B1 | 10/2002 | Pederson |
| 6,476,726 B1 | 11/2002 | Pederson |
| 6,504,487 B1 | 1/2003 | Pederson |
| 6,547,410 B1 | 4/2003 | Pederson |
| 6,548,967 B1 * | 4/2003 | Dowling et al. ............ 315/318 |
| 6,590,343 B1 | 7/2003 | Pederson |
| 6,590,502 B1 | 7/2003 | Pederson |
| 6,600,274 B1 | 7/2003 | Hughes |
| 6,600,899 B1 * | 7/2003 | Radomsky et al. ......... 455/3.05 |
| 6,614,359 B2 | 9/2003 | Pederson |
| 6,623,151 B2 | 9/2003 | Pederson |
| 6,683,590 B1 | 1/2004 | Pang |
| 6,690,294 B1 | 2/2004 | Zierden |

(56) References Cited

U.S. PATENT DOCUMENTS

| | | | |
|---|---|---|---|
| 6,693,551 B2 | 2/2004 | Pederson | |
| 6,705,745 B1 | 3/2004 | Pederson | |
| 6,707,389 B2 | 3/2004 | Pederson | |
| 6,788,217 B2 | 9/2004 | Pederson | |
| 6,814,459 B2 | 11/2004 | Pederson | |
| 6,819,654 B2 | 11/2004 | Soloway | |
| 6,819,677 B1 | 11/2004 | Nouzovsky | |
| 6,822,578 B2 | 11/2004 | Pederson | |
| 6,844,824 B2 | 1/2005 | Vukosic | |
| 6,879,263 B2 | 4/2005 | Pederson | |
| 6,892,942 B1 | 5/2005 | Widl | |
| 7,006,768 B1* | 2/2006 | Franklin | 398/127 |
| 7,023,469 B1 | 4/2006 | Olson | |
| 7,046,160 B2 | 5/2006 | Pederson | |
| 7,102,665 B1 | 9/2006 | Chandler | |
| 7,103,614 B1 | 9/2006 | Kucik | |
| 7,183,895 B2 | 2/2007 | Bazakos | |
| 7,230,884 B2 | 6/2007 | Shemesh | 368/46 |
| 7,289,731 B2 | 10/2007 | Thinguldstad | |
| 7,324,757 B2 | 1/2008 | Wilson | |
| 7,352,972 B2* | 4/2008 | Franklin | 398/172 |
| 7,439,847 B2 | 10/2008 | Pederson | 340/5.81 |
| 7,548,698 B2* | 6/2009 | Yamamoto | 398/172 |
| 7,557,521 B2 | 7/2009 | Lys | |
| 7,583,901 B2* | 9/2009 | Nakagawa et al. | 398/183 |
| 7,689,130 B2* | 3/2010 | Ashdown | 398/172 |
| 7,912,377 B2* | 3/2011 | Koga | 398/172 |
| 8,126,554 B2 | 2/2012 | Kane et al. | 607/22 |
| 8,175,799 B1* | 5/2012 | Woehler | 701/408 |
| 8,188,878 B2 | 5/2012 | Pederson | |
| 8,188,879 B2 | 5/2012 | Pederson | |
| 8,207,821 B2* | 6/2012 | Roberge et al. | 340/9.11 |
| 8,538,692 B2 | 9/2013 | Wurman | |
| 8,571,411 B2 | 10/2013 | Pederson | |
| 2002/0109892 A1 | 8/2002 | Seto | |
| 2002/0168958 A1* | 11/2002 | Ford et al. | 455/404 |
| 2003/0025608 A1 | 2/2003 | Pederson | |
| 2003/0118216 A1* | 6/2003 | Goldberg | 382/115 |
| 2003/0156037 A1 | 8/2003 | Pederson | |
| 2003/0169164 A1 | 9/2003 | Lau | |
| 2003/0185340 A1 | 10/2003 | Frantz | |
| 2003/0212996 A1 | 11/2003 | Wolzien | |
| 2003/0222587 A1 | 12/2003 | Dowling | |
| 2004/0044709 A1 | 3/2004 | Cabrera | |
| 2004/0101312 A1* | 5/2004 | Cabrera | 398/172 |
| 2004/0151344 A1 | 8/2004 | Farmer | |
| 2004/0153229 A1 | 8/2004 | Gokturk | |
| 2004/0208599 A1* | 10/2004 | Swartz et al. | 398/135 |
| 2005/0002673 A1 | 1/2005 | Okano | |
| 2005/0005794 A1 | 1/2005 | Inukai | |
| 2005/0057941 A1 | 3/2005 | Pederson | |
| 2005/0111700 A1 | 5/2005 | OBoyle | |
| 2005/0169643 A1* | 8/2005 | Franklin | 398/187 |
| 2005/0231128 A1* | 10/2005 | Franklin | 315/224 |
| 2006/0039698 A1* | 2/2006 | Pautler et al. | 398/33 |
| 2006/0056855 A1* | 3/2006 | Nakagawa et al. | 398/183 |
| 2006/0132382 A1 | 6/2006 | Jannard | |
| 2006/0149813 A1 | 7/2006 | Janik | |
| 2006/0213731 A1 | 9/2006 | Lesesky | |
| 2006/0238368 A1* | 10/2006 | Pederson et al. | 340/815.45 |
| 2006/0275040 A1* | 12/2006 | Franklin | 398/172 |
| 2007/0104239 A1 | 5/2007 | Koga | |
| 2007/0110446 A1 | 5/2007 | Hong | |
| 2007/0145915 A1* | 6/2007 | Roberge et al. | 315/312 |
| 2007/0147843 A1 | 6/2007 | Fujiwara | |
| 2007/0160373 A1 | 7/2007 | Biegelsen | |
| 2007/0165244 A1 | 7/2007 | Yukhin | |
| 2007/0269219 A1 | 11/2007 | Teller | |
| 2007/0294029 A1 | 12/2007 | DAndrea | |
| 2008/0044188 A1 | 2/2008 | Kagawa et al. | 398/128 |
| 2008/0063404 A1* | 3/2008 | Broyde et al. | 398/130 |
| 2008/0154101 A1 | 6/2008 | Jain | |
| 2008/0227463 A1* | 9/2008 | Hizume et al. | 455/456.1 |
| 2009/0002265 A1 | 1/2009 | Kitaoka | |
| 2009/0129782 A1 | 5/2009 | Pederson | |
| 2009/0157545 A1 | 6/2009 | Mobley | |
| 2010/0111538 A1* | 5/2010 | Arita et al. | 398/130 |
| 2011/0006898 A1 | 1/2011 | Kruest | |
| 2012/0202520 A1 | 8/2012 | George | |
| 2012/0230696 A1 | 9/2012 | Pederson | |
| 2014/0153923 A1* | 6/2014 | Casaccia et al. | 398/58 |

FOREIGN PATENT DOCUMENTS

| | | |
|---|---|---|
| CA | 2164920 | 6/1996 |
| DE | 4304216 | 8/1994 |
| DE | 19502735 | 8/1996 |
| DE | 19548639 | 6/1997 |
| DE | 19721673 | 11/1997 |
| DE | 29712281 | 1/1998 |
| EP | 0326668 | 8/1989 |
| EP | 0468822 | 1/1992 |
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 0967590 | 12/1999 |
| EP | 1043189 | 10/2000 |
| EP | 1564914 | 8/2005 |
| FR | 2658024 | 8/1991 |
| FR | 2680861 | 3/1993 |
| FR | 2707222 | 1/1995 |
| FR | 2800500 | 5/2001 |
| GB | 1241369 | 8/1971 |
| GB | 2069257 | 8/1981 |
| GB | 2139340 | 11/1984 |
| GB | 2175428 | 11/1986 |
| GB | 2240650 | 2/1990 |
| GB | 2111270 | 6/1993 |
| GB | 2272791 | 5/1994 |
| GB | 2292450 | 2/1996 |
| GB | 2311401 | 9/1997 |
| GB | 2323618 | 9/1998 |
| GB | 2330679 | 4/1999 |
| GB | 2359179 | 8/2001 |
| GB | 2359180 | 8/2001 |
| JP | 60143150 | 7/1985 |
| JP | S63153166 | 6/1988 |
| JP | 06333403 | 12/1994 |
| JP | 6333403 | 12/1994 |
| JP | 08002341 | 1/1996 |
| JP | 8002341 | 1/1996 |
| JP | 10098778 | 4/1998 |
| WO | 9750070 | 12/1997 |
| WO | 9935634 | 7/1999 |
| WO | 9942985 | 8/1999 |
| WO | 9949435 | 9/1999 |
| WO | 9949446 | 9/1999 |
| WO | 0074975 | 12/2000 |
| WO | 0101675 | 1/2001 |
| WO | 0110674 | 2/2001 |
| WO | 0110675 | 2/2001 |
| WO | 0110676 | 2/2001 |
| WO | 0225842 | 3/2002 |
| WO | 02073836 | 9/2002 |
| WO | 2007003037 | 11/2007 |

OTHER PUBLICATIONS

Kahn et al., "Wireless Infrared Communications," Proceedings of the IEEE, vol. 85, No. 2, Feb. 1997, pp. 265-298.

Jeffrey B. Carruthers, "Wireless Infrared Communications," Wiley Encyclopedia of Telecommunications, 2002.

Akhavan et al., "High-Speed Power-Efficient Indoor Wireless Infrared Communication Using Code Combining-Part I," IEEE Trnsactions on Communications, vol. 50, No. 7, Jul. 2002, pp. 1098-1109.

(56) References Cited

OTHER PUBLICATIONS

Djahani et al., "Analysis of Infrared Wireless Links Employing Multibeam Transmitters and Imaging Diversity Receivers," IEEE Transactions on Communications, vol. 48, No. 12, Dec. 2000, pp. 2077-2088.

Komine T. et al., "Integrated System of White LED Visible-Light Communicaiton and Power-Line Communication," 20020915; 20020915-20020918, vol. 4, Sep. 15, 2002, pp. 1762-1766.

Hawaiian Electric Company, Inc.: Powerlines—Energy Efficiency Takes-off at Honolulu International Airport, Spring 2008, pp. 1-13.

Pacific Northwest National Laboratory: Demonstration Assement of Light-Emitting Diode (LED) Parking Lot Lighting, Phase 1, Jun. 2010, pp. 1-37.

Van Wicklen, Garrett L.: Using LED Lights Can Reduce Your Electricity Costs, Dec. 2005, Cooperative Extension Service, Applied Poultry Engineering News, vol. 3, No. 1, pp. 1-4.

\* cited by examiner

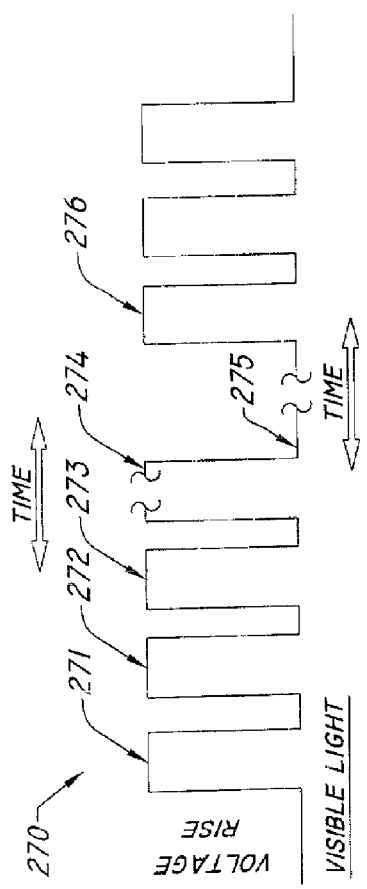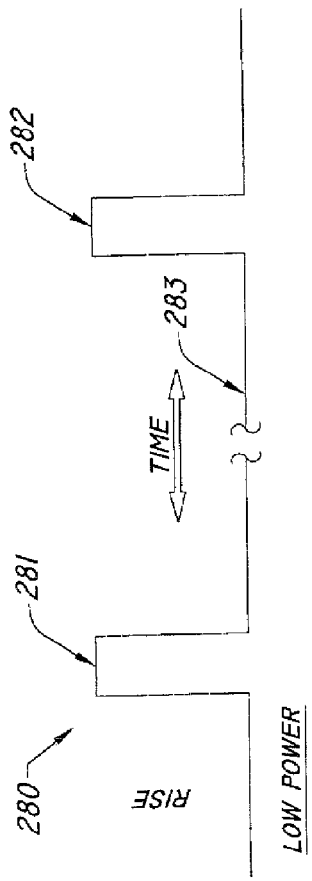

LED LIGHT BROAD BAND OVER POWER LINE COMMUNICATION SYSTEM

CROSS REFERENCE TO RELATED APPLICATIONS

This application is a Continuation from Ser. No. 13/426,962, filed Mar. 22, 2012; which is a Continuation from Ser. No. 12/126,469, filed May 23, 2008 which claims priority to U.S. provisional patent application Ser. No. 60/931,611 filed May 24, 2007, the entire content of which is incorporated herein by reference.

STATEMENT AS TO RIGHTS TO INVENTIONS MADE UNDER FEDERALLY SPONSORED RESEARCH AND DEVELOPMENT

Not applicable.

FIELD OF THE INVENTION

This invention pertains generally to the data communications, and more particularly to improved communications apparatus providing enhanced data communications, signaling and control systems using visible light with embedded communications signals.

BACKGROUND OF THE INVENTION

Modern communications systems interconnect various electrical, electro-mechanical, or electrically controlled apparatuses. These connections may be referred to as connections between client devices and host devices. For the purposes of the present disclosure, host devices are simply parts of the network that serve to host or enable communications between various client devices. Generally speaking, host devices are apparatuses that are dedicated to providing or enabling communications, but this does not have to be the case. Peer-to-peer networks exist wherein, at any given moment, a device may be either client or host. In such a network, when the device is providing data, information or services, it may be referred to as the host, and when the same device is requesting information, it may be referred to as the client.

The host may provide connection to a Local Area Network (LAN), sometimes referred to as an Intranet, owing to the common use of such a network entirely within an office space, building, or business. The host may additionally or alternatively provide connection to a Wide Area Network (WAN), commonly describing a network coupling widely separated physical locations which are connected together through any suitable connection, including for exemplary purposes but not solely limited thereto such means as fiber optic links, T1 lines, Radio Frequency (RF) links including cellular telecommunications links, satellite connections, DSL connections, or even Internet connections. Generally, where more public means such as the Internet are used, secured access will commonly separate the WAN from general Internet traffic. The host may further provide access to the Internet. Exemplary host apparatuses include modems, routers, switches, or other devices that may enable or secure communications with clients, even including other clients as noted herein above.

A variety of client devices have heretofore been enabled to connect to host devices. Such client devices may commonly include computing devices of all sorts, ranging from handheld devices such as Personal Digital Assistants (PDAs) to massive mainframe computers, and including Personal Computers (PCs). However, over time many more devices have been enabled for connection to network hosts, including for exemplary purposes printers, network storage devices, cameras, other security and safety devices, appliances, HVAC systems, manufacturing machinery, and so forth. Essentially, any device which incorporates or can be made to incorporate sufficient electronic circuitry may be so linked as a client to a host.

Most current communications systems rely upon wires and/or radio waves to link clients and hosts. Existing client devices are frequently designed to connect to host network access points through wired connections, like copper wire, for example, fiber optic connections, or as wireless connections, such as wireless routers or wireless access points.

In the case of a wired system, whether through simple wire, twisted wire, co-axial cable, fiber optics or other line or link, the host and client are tethered together through this physical communications channel. A wired systems must physically span between the apparatus, such as client and host, and therefore must be physically placed or installed. Inside of a building, since these wires must remain during communications the tether thus created limits movement of the client relative to the host. The wire is often unsightly and hard to contain in a work space. The wire may also be or become a tripping hazard. In addition, electrical connectors such as jacks must be provided, and these connectors necessarily limit the number of access points and locations. The installation of connectors defaces walls, sometimes rendering them unsuitable for a particular desired application, and yet they add undesirable installation expense, whether during new construction or in retrofitting an existing building structure. Outside of a building, wires are subject to lightning strikes, EMI/RFI generation and reception, and breakage as known to occur during ice storms in the case of overhead wires and accidental cutting during excavating in the case of buried cables.

In contrast, in the case of wireless routers a radio signal replaces the physical communications channel between clients and hosts with a radio channel. This advantageously eliminates the wire tether between client and host. Instead, client devices in a wireless system try through various broadcasts and signal receptions to find an access point that will have adequate transmission and reception, generally within a certain signal range which may range from a few meters to as many as several tens of meters. The systems are programmed to bridge from a host access point to various client devices through known exchanges of information, commonly described as communications protocols or handshakes. Depending upon the communications channel, a variety of client connection devices are utilized such as PCMCIA or PC cards, serial ports, parallel ports, SIMM cards, USB connectors, Ethernet cards or connectors, firewire interfaces, Bluetooth compatible devices, infrared/IrDA devices, and other known or similar components. The security of these prior art wireless devices can be compromised in that they are vulnerable to unauthorized access or interception, and the interception may be from a significant distance, extending often well beyond physical building and property boundaries. Moreover, reliability can be hindered by interference from an appliance such as a microwave oven or other machinery or apparatus.

Because of the ever-changing nature of a building and the best practices associated therewith, it can be quite difficult if not impossible to keep all areas within a building up to date with best practices or preferred capabilities. One common obstacle to providing desirable features or capabilities within a building space is the need for electrical wiring adequate to accommodate the features or capabilities, particularly when the features or capabilities are identified subsequent to original construction.

Even where a building is originally provided with appropriate wiring for each electrical system or component desired, necessary remodeling may critically alter the need. As one example, consider when a room or space is subdivided into two smaller spaces. Existing wiring only provides for electrical connection to one set of devices for one room. In this case, it may be necessary to run new wires back to one or more central locations, utility rooms, or the like to accommodate the new room and devices within the room.

More buildings are incorporating wireless networks within the building, the networks which are intended to reduce the need for wiring alterations and additions practiced heretofore. However, these wireless networks are not contained within the walls of a building, and so they are subject to a number of limitations. One of these is the lack of specific localization of a signal and device. For exemplary purposes, even a weak Radio-Frequency (RF) transceiver, in order to communicate reliably with all devices within a room, will have a signal pattern that will undoubtedly cross into adjacent rooms. If only one room or space in a building is to be covered, this signal overlap is without consequence. However, when many rooms are to be covered by different transceivers, signal overlap between transceivers requires more complex communications systems, including incorporating techniques such as access control and device selection based upon identification. Since the radio signal is invisible, detection of radiant pattern and signal strength are difficult and require special instruments. Further, detection of interference is quite difficult. Finally, such systems are subject to outside tapping and corruption, since containment of the signal is practically impossible for most buildings.

In addition to data communications, buildings and other spaces may also have a number of additional important needs including, for exemplary purposes though not limited thereto, illumination, fire and smoke detection, temperature control, and public address. With regard to illumination, buildings and other spaces are designed with a particular number and placement of particular types of light bulbs. Most designers incorporate incandescent or fluorescent bulbs to provide a desirable illumination within a space. The number and placement of these bulbs is most commonly based upon the intended use of the space.

Original electric light bulbs were incandescent. With sufficient electrical energy, which is converted to heat within an incandescent bulb filament, the filament will emit visible light. This is similar to a fire, where with enough heat, visible light is produced. As most materials are heated, they will first begin to glow a dull red. As the temperature is raised further, the color changes to a brighter red, then yellow, then white, and finally to a blue color. Likewise, flames exhibit this same coloring depending upon the temperature of a flame. Most people will recall the blue and yellow portions of candle flames. To permit comparisons between different light sources, the color produced by a light bulb is compared to a hot body at a known temperature, which will emit light having color shades that depend upon the temperature.

Most incandescent bulbs emit light at a color temperature typically in the vicinity of 3,000 degrees Kelvin. This is considered to be a warm hue, which is often prized in relaxed settings such as those of a living room or dining room. This color of light more closely resembles gentle candle light.

In contrast to warm incandescent light, work and study environments are more preferably illuminated with light of more blue content, more closely resembling daylight. Color temperatures of approximately 6,000 degrees Kelvin resemble daylight. Daylight color temperatures are not practically obtained using an incandescent bulb.

Not only are incandescent bulbs limited to lower color temperatures and yellow hues, these bulbs also only have a few thousand hour life expectancy. The extreme temperatures required for the filament to light also gradually evaporates the filament material. Also undesirably, incandescent bulbs produce far more heat than light, meaning they are inefficient in converting electrical energy into light. These limitations exist even though there have been more than a century of improvements. Nevertheless, and in spite of the many limitations, incandescent bulbs are still in fairly wide-spread use today.

There exist many choices of bulb types today, including but not limited to the incandescent bulb. The selection of light bulb type can be used to control both intensity and color of illumination. Color of illumination as used herein may include specific optical wavelengths associated with one or another color within the visible spectrum, but will also be understood to refer to various color temperatures as already described herein above.

An alternative to incandescent light bulbs in common use today is the fluorescent bulb. A fluorescent light bulb uses a small amount of mercury in vapor state. High voltage electricity is applied to the mercury gas, causing the gas to ionize and generate some visible light, but primarily Ultraviolet (UV) light. UV light is harmful to humans, being the component that causes sun burns, so the UV component of the light must be converted into visible light. The inside of a fluorescent tube is coated with a phosphorescent material, which when exposed to ultraviolet light glows in the visible spectrum. This is similar to many glow-in-the-dark toys and other devices that incorporate phosphorescent materials. As a result, the illumination from a fluorescent light will continue for a significant time, even after electrical power is discontinued, which for the purposes of the present disclosure will be understood to be the latent period or latency between the change in power status and response by the phosphor. As the efficiencies and brightness of the phosphors has improved, so in many instances have the delays in illumination and extinguishing, or latency, increased. Through the selection of ones of many different modern phosphorescent coatings at the time of manufacture, fluorescent bulbs may be manufactured that produce light from different parts of the spectrum, resulting in manufacturing control of the color temperature, or hue or warmness of a bulb.

The use of fluorescent bulbs, even though quite widespread, is controversial for several reasons. One source states that all pre-1979 light ballasts emit highly toxic Polychlorinated BiPhenyls (PCBs). Even if modern ballasts are used, fluorescent bulbs also contain a small but finite amount of mercury. Even very small amounts of mercury are sufficient to contaminate a property. Consequently, both the manufacture and disposal of mercury-containing fluorescent tubes is hazardous. Fluorescent lighting has also been alleged to cause chemical reactions in the brain and body that produce fatigue, depression, immuno-suppression, and reduced metabolism. Further, while the phosphor materials may be selected to provide hue or color control, this hue is fixed at the time of manufacture, and so is not easily changed to meet changing or differing needs for a given building space.

Other gaseous discharge bulbs such as halide, mercury or sodium vapor lamps have also been devised. Halide, mercury and sodium vapor lamps operate at higher temperatures and pressures, and so present undesirably greater fire hazards. In addition, these bulbs present a possibility of exposure to harmful radiation from undetected ruptured outer bulbs. Furthermore, mercury and sodium vapor lamps generally have very poor color-rendition-indices, meaning the light rendered by these bulbs is quite different from ordinary daylight, distorting human color perception. Yet another set of disadvantages has to do with the starting or lighting of these types of bulbs. Mercury and sodium vapor lamps both exhibit extremely slow starting times, often measured by many minutes. The in-rush currents during starting are also commonly large. Many of the prior art bulbs additionally produce significant and detrimental noise pollution, commonly in the form of a hum or buzz at the frequency of the power line alternating current. In some cases, such as fluorescent lights, ballasts change dimension due to magnetostrictive forces. Magnetic field leakage from the ballast may undesirably couple to adjacent conductive or ferromagnetic materials, resulting in magnetic forces as well. Both types of forces will generate undesirable sound. Additionally, in some cases a less-optimal bulb may also produce a buzzing sound.

When common light bulbs are incorporated into public and private facilities, the limitations of prior art bulb technologies often will adversely impact building occupants. As just one example, in one school the use of full-spectrum lamps in eight experimental classrooms decreased anxiety, depression, and inattention in students with SAD (Seasonal Affective Disorder). The connection between lighting and learning has been conclusively established by numerous additional studies. Mark Schneider, with the National Clearinghouse for Educational Facilities, declares that ability to perform requires "clean air, good light, and a quiet, comfortable, and safe learning environment." Unfortunately, the flaws in much of the existing lighting have been made worse as buildings have become bigger. The foregoing references to schools will be understood to be generally applicable to commercial and manufacturing environments as well, making even the selection of types of lights and color-rendition-indexes very important, again depending upon the intended use for a space. Once again, this selection will be fixed, either at the time of construction when a particular lighting fixture is installed, or at the time of bulb installation, either in a new fixture or with bulb replacements.

GENERAL DESCRIPTION OF THE INVENTION

This application is related to the patent application entitled "LED Light Communication System," U.S. patent application Ser. No. 12/126,529, filed May 23, 2008, which is incorporated by reference herein in its entirety. The present application is also related to the patent application entitled "LED Light Dongle Communication System," U.S. patent application Ser. No. 12/126,227, filed May 23, 2008, which is incorporated herein by reference in its entirety. The present application is also related to the patent application entitled "Building Illumination Apparatus With Integrated Communications, Security and Energy Management," U.S. patent application Ser. No. 12/126,342, filed May 23, 2008, which is incorporated herein by reference in its entirety. Also the present application is related to the patent application entitled "LED Light Interior Room and Building Communication System," U.S. patent application Ser. No. 12/126,647, filed May 23, 2008, which is incorporated by reference herein it its entirety. The present application is also related to the patent application entitled "LED Light Global Positioning And Routing Communication System," U.S. patent application Ser. No. 12/126,589, filed May 23, 2008, which is incorporated by reference in its entirety.

Applicant additionally incorporates by reference herein patent application Ser. No. 10/646,853, filed Aug. 22, 2003, which claims the benefit of provisional patent application Nos. 60/405,592 and 60/405,379, both filed Aug. 23, 2002, the disclosures of all three being expressly incorporated herein by reference.

Further, Applicant incorporates by reference herein patent application Ser. No. 12/032,908, filed Feb. 18, 2008, which is continuation of patent application Ser. No. 11/433,979, filed May 15, 2006, which is a continuation of patent application Ser. No. 11/102,989, filed Apr. 11, 2005, now issued U.S. Pat. No. 7,046,160, which is a division of patent application Ser. No. 09/993,040, filed Nov. 14, 2001, now issued U.S. Pat. No. 6,879,263, which claims the benefit of provisional patent application No. 60/248,894, filed Nov. 15, 2000, the entire contents of each being expressly incorporated herein by reference.

According to the invention, there is provided an illumination apparatus that is capable of illuminating a space and simultaneously capable of communicating through visible light directly with a number of adjunct devices. In addition to human communications, communications with adjunct devices may effect various convenience, security, energy management and related functions. The illumination apparatus further enables control over intensity, color temperature, and even color without requiring any physical change.

Visible Light Embedded Communication, or VLEC, as taught herein is a secure last mile solution to many diverse communications needs. Last mile refers to the final portion of any communications system, and it is commonly known that the last mile normally demands the vast majority of expense and difficulty in establishing and maintaining a system. Light Emitting Diodes, or LEDs, provide with other apparatus a communications channel while simultaneously affording flexible illumination within a space or building. Using LEDs to provide visible lighting and to embed communications therein enables the present invention to improve security and provide higher capacity over that known in the prior art. LEDs are similar to fiber optic communications in capability and bandwidth, but do so without the fiber. The LED link is therefore untethered and enables a communication link with nomadic devices. The link is untethered in that the user is independent of any one host, and may get the same information at other optical hosts.

In an Access BPL system, data is carried as a signal through existing mediums like fiber-optic cable, radio waves, conventional telephone lines, or through the present invention Visible Light Embedded Communications (VLEC) around high-voltage lines. It is then injected into the power grid downstream, onto medium or low voltage wires to businesses and homes. Through advanced electronic equipment, the signal makes its way to Industrial parks and neighborhoods. Customers may then gain access via a VLEC source and ferry the data back and forth to their computers through a Client VLEC Dongle or other appropriate adapter.

A VLEC designed in accord with the teachings of the present invention may interface with new or existing building internal electrical wiring. By positioning architectural lighting fixtures that dual as VLEC transceivers, a building space may be efficiently illuminated while accomplishing high-speed secure wireless data communication. The LEDs that are incorporated into VLEC transceivers are environmentally friendly and relatively insensitive to atmospheric conditions. LEDs can be configured as directional lights by providing or incorporating various lenses or reflectors, or may alternatively be configured as omni-directional lights for room lighting purposes. The room lighting colors of a VLEC can be made to mimic traditional lighting of today, including intensity, color, and color temperature. A VLEC has the added benefit of communicating by pulsing the LEDs in such a way as to communicate data at nearly the same rate or capacity as modern fiber optic channels.

Embodiments designed in accord with the teachings of the present invention may fully integrate into existing networks and infrastructures presently in use. Security and access levels will be controlled on the back end of the network by employing known equipment such as a firewalls, routers and hubs. Embodiments of the present invention are meant to improve and compliment communication areas that fall short in today's existing infrastructure, from full duplex communications of voice to ultra high speed broadband packet data transfers for full motion video, on highly reliable, scalable, stable and fully redundant infrastructures. Most deployments are easily started by taking advantage of existing infrastructures and applying low cost fill-in or gap solutions. Many modulations schemes available today, such as CDMA, OFDM, TDM, PWM, PPM, PDM, AM, BPSK and specific layers of QAM, to name a few, may be used in conjunction with the present invention. Access BPL and In-house BPL capacity, including both governmentally licensed and unlicensed BPL/PLC apparatus and methods, may augment the present invention in a quest for a complete system design. Low-power, unlicensed BPL/PLC systems may be used to provide high speed digital communications capabilities by coupling RF energy onto the power lines inside a building. In addition, higher speeds than available from existing Access BPL technology may be obtained in the preferred embodiments by encasing the electrical wire in conduit, thereby implementing Shielded BPL (S-BPL) in accord with the present teachings. S-BPL as taught herein prevents or further reduces unwanted Electro-Magnetic Interference or Radio Frequency Interference (EMI/RFI) and thereby may provide higher data speeds for a variety of applications using VLEC embodiments.

The present invention combines visible light generation and control with embedded communications capacity.

The present invention capitalizes on existing infrastructure, with simple replacement of existing luminary devices and incorporation of S-BPL transceivers or the like, to achieve visible light generation and control with embedded potentially large bandwidth communications capacity.

The present invention integrates a variety of prior art communications functions into a single system, such as security, safety, HVAC and other diverse functions.

The present invention monitors and anticipates the need for a limited space or room within a building.

The present invention provides several types of communications with a room and electrical devices therein, including audible, visual and optical LED communications.

The present invention includes the use of visible light as the communications channel between client and host, which offers security, reliability, system testing and configuration, bandwidth, infrastructure, and mobility, among other things. Yet another advantage of the present invention improves security, because light does not go through walls, in contrast to radio communications, and steps can be taken to obstruct visible transmissions with a much greater certainty than with high frequency radio waves.

The present invention provides ability to limit or direct visible light by known optical components such as lenses and reflectors to selectively form beams, as opposed to omni-directional transmissions.

The present invention reduces interference with existing communication systems like those that are common today. Consequently, the preferred embodiment may be used in a variety of applications where prior art systems were simply unable due to EMI/RFI considerations.

The present invention simplifies set-up, testing, troubleshooting and the like of a communication system. When the light communication system is working, the user can actually see the illumination. If an object interferes with light transmission, the user will again immediately recognize the same. Thus, the ease and convenience of this visible light system adds up to greater mobility and less cost.

The present invention provides relatively high energy outputs where desired using the preferred visible light communications channel, since the human eye is adapted and well-protected against damage from visible light. In contrast, many invisible transmission techniques such as Ultraviolet (UV) or Infra-Red (IR) systems have much potential for harm.

The invention enables individual or selected groups of lights to be selectively configured for optimal physiological and psychological effects and benefits for one or more applications, and then be readily reconfigured without changes to physical structures for diverse applications having different requirements for optimal physiological and/or psychological effects and benefits.

As a corollary thereto, the present invention provides individually addressed lamp units, permitting extreme flexibility in control and interactive systems.

The present invention reduces the need for extrinsic redundancy through the novel selection and placement of apparatus.

The present invention is highly reliable presence and identity detection, and the operation responsive thereto of illumination, communication and security functions.

The present invention has the capacity to provide low power communications for energy management, emergency back-up, security and special applications utilizing alternative power sources such as batteries or solar cells.

The present invention reduces peak inrush current by controlling the timing of illumination and other equipment start-up.

The present invention incorporates of real time locating systems for humans, permitting electronic monitoring and locating in or after emergency situations, or for simple real-time locators. Similarly, inanimate objects may be tracked and accounted for automatically, using less sophisticated communications tags.

The present invention also has sufficient communications bandwidth to incorporate smart video integration.

The present invention has the ability to provide embedded communications through visible light, whether or not the visible light is at an intensity great enough for sufficient duration to be detected by the human eye.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 17 illustrates a waveform of a visible light emission from an active and visually illuminated LED in accord with an embodiment of the invention.

FIG. 18 illustrates a waveform of an invisible or barely perceptible light emission from an active and dark LED in accord with an embodiment of the invention.

DETAILED DESCRIPTION OF THE PREFERRED EMBODIMENTS

Figure 1:
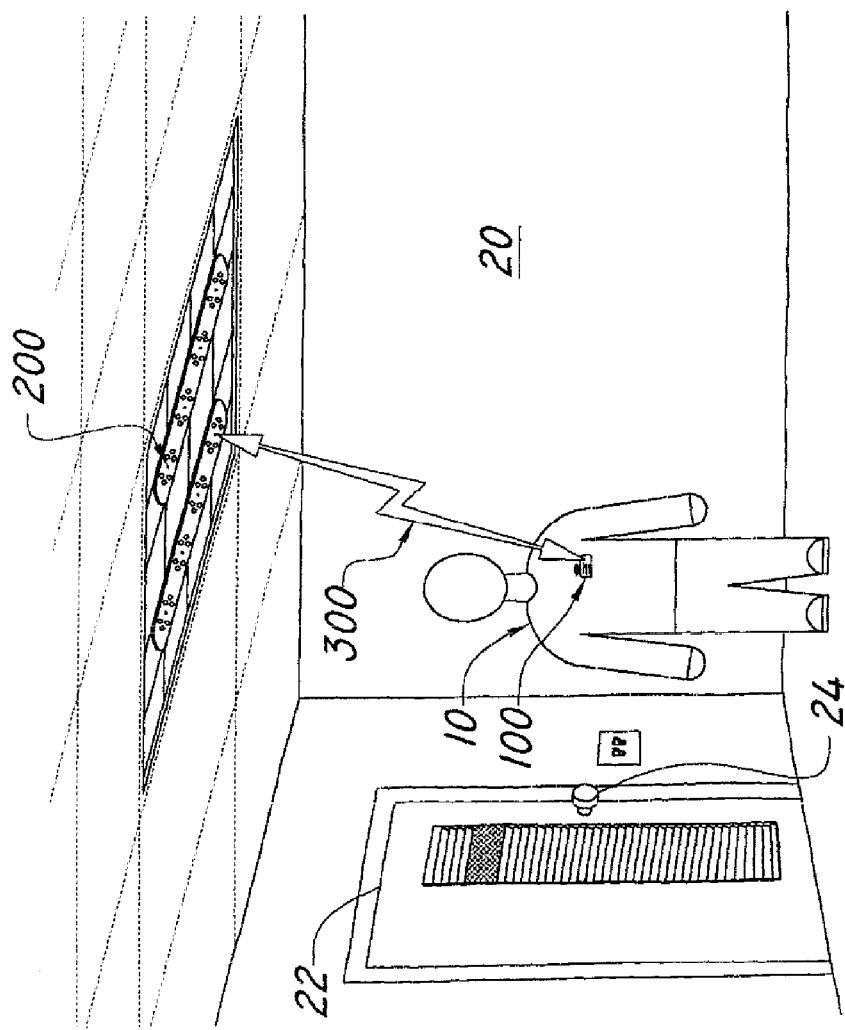
FIG. 1 illustrates by front environmental view an embodiment of a visible light embedded communications apparatus having a personal communications badge in communication with an LED optical light panel in accord with the teachings of the present invention.

In accord with the teachings of the present invention, a Visible Light Embedded Communications (VLEC) apparatus will most preferably incorporate several terminal components. FIG. 1 illustrates an exemplary combination of terminal components, including a communication badge 100 and a VLEC Light Emitting Diode (LED) light panel 200. Communication badge 100 and LED light panel 200 are coupled through an optical communications channel 300. Badge 100 is pinned to, affixed with or otherwise transported by a person 10, in the embodiment as illustrated as a replacement for standard security identification badges.

Figure 3:
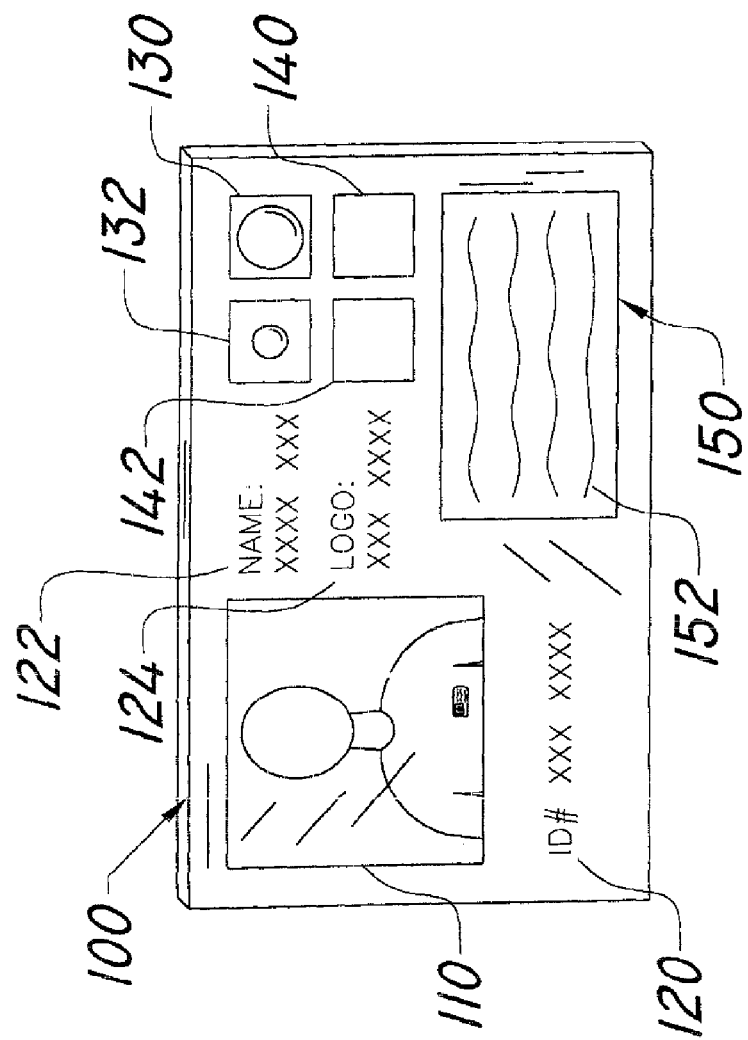
FIG. 3 illustrates by detailed front view the personal communications badge of FIG. 1.

Badge 100 is illustrated in greater detail in FIG. 3, and may include external features commonly found in standard security identification badges, including but not limited to such attributes as a photograph 110 of the person assigned to the badge, and indicia such as employee identification or number 120, name 122, and business or entity logos 124. Business or entity logos 124, or other components may integrate anti-counterfeiting technology as may be available or known for such diverse applications as passports, driver's licenses, currency and other applications. Commonly used devices include holograms, watermarks, special materials or unique threads, and embedded non-alterable electronic, visible, sonic or other identification codes. An optical transmitter 130 and receiver 132 are most preferably provided and enable communication over optical communications channel 300. A microphone, loudspeaker, microphone and speaker combination, or dual-purpose device 140 may be provided to integrate an auditory communication channel between communication badge 100 and nearby living beings or other animate or inanimate objects. A video camera 142 may be incorporated to capture video or still pictures. A video display 150 may additionally be incorporated into communication badge 100, permitting information 152 to be displayed thereon, which could for exemplary purposes could comprise either text or graphics.

Communication badge 100 communicates with VLEC LED light panel 200. LED light panel 200, illustrated by magnified view in FIG. 2, has a body 205 that incorporates at least one, and preferably a plurality of LEDs and optical detectors. One or more optical detectors 220 may be provided, and may either be broad spectrum detectors or alternatively color-filtered or sensitive to only a single color. The detector will be any of the many known in the art, the particular selection which will be determined by well-known considerations such as sensitivity, reliability, availability, cost and the like.

Figure 2:
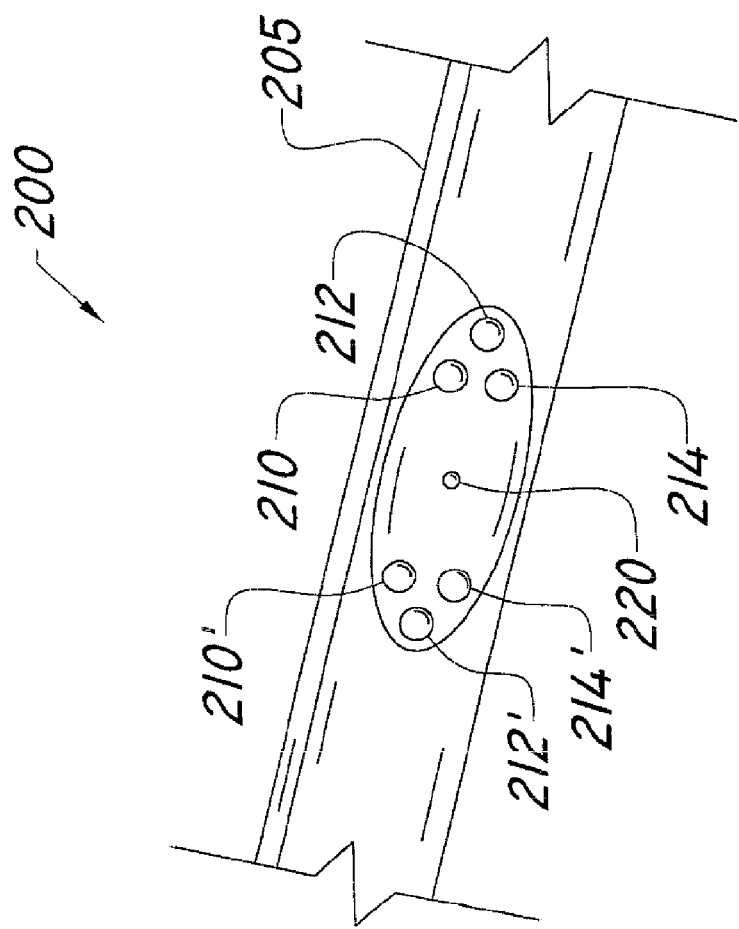
FIG. 2 illustrates by detailed bottom view a part of the LED optical light panel of FIG. 1.

As illustrated, LEDs are in clusters of three. In accord with the present invention, these LEDs are RGB LEDs, designating that they include red, blue and green which are the primary additive colors from which all other colors including white may be produced. For exemplary purposes only, LED 210 may generate red light, commonly of approximately 650 nanometer wavelength, LED 212 may generate blue light, commonly of approximately 475 nanometer wavelength, and LED 214 may generate green light, commonly of approximately 565 nanometer wavelength. LEDs 210-214 may be discrete components, or may alternatively be integrated onto a common die and take the physical form of a single LED. Furthermore, more than one RGB LED may be integrated upon a single die or within a common package, as may be deemed most appropriate by a manufacturer. A plurality of RGB LEDs may also be provided upon or within a single body 205, as illustrated in FIG. 2 by RGB LEDs 210', 212' and 214'. In practice, there is no limit to the number of RGB LEDs that may be used, other than physical size and available space limitations, and thermal dissipation capacity and power requirement constraints.

By controlling the relative power applied to each one of the RGB LEDs 210-214, different colors may be produced. This concept is well-known as the RGB model, and is used today in nearly all video displays. Color televisions and computer monitors, for example, incorporate very small red, green and blue (RGB) dots adjacent to each other. To produce white regions on the screen, all three RGB dots are illuminated. Black dots are the result of none of the RGB dots being illuminated. Other colors are produced by illuminating one or more of the dots at different relative levels, or alternatively controlling how many closely adjacent dots of one primary color are fully illuminated relatively to the other two primary colors.

Through the use of RGB LEDs, color temperature of an LED light panel 200 may be adjusted or controlled, and may be varied in real time without making any hardware or apparatus changes. Instead, power applied to the RGB LEDs is adjusted to favor one or another of the RGB LEDs 210-214. Since the light emitted from the RGB LEDs is approximately full-spectrum light, the color-rendering index may also be relatively high, particularly when compared to mercury or sodium vapor lamps, making the light feel very natural.

While human eyes are substantially more tolerant of visible light, and while visible light intensity is readily discerned by humans, there is some description in the prior art of potential hazards associated with extreme intensity blue-wavelength illumination. In an embodiment of the invention, safeguards may be programmed or designed into the control of RGB LEDs 210-214 to prevent occurrence of conditions that could lead to blue-light hazard or other safety hazard that might potentially exist.

While other options exist for producing white light from LEDs, the use of an RGB LED absent of phosphors is preferred for most applications of the present invention. Not only is color of the light easily controlled using well-known RGB technology, but also by their very nature phosphors tend to slow down the rate at which an LED may be illuminated and extinguished due to phosphor latencies. For the purposes of the present invention, where an optical communications channel 300 is created between LED light panel 200 and one or more communications badges 100, higher data transfer rates may be obtained with more rapid control of illumination levels. Consequently, if phosphors are used in the generation of light from LED light panel 200, and if faster data exchange rates through optical communications channel 300 are desired, these phosphors will preferably be very fast lighting and extinguishing.

A variety of physical and electrical configurations are contemplated herein for LED light panel 200. As illustrated in FIG. 1, light panel 200 may replace a standard fluorescent tube light fixture. This may be accomplished by replacing the entire fixture such that ballasts and other devices specific to fluorescent lighting are replaced. In many cases, this will be the preferred approach. The fixture may then be wired for any suitable or desired voltage, and where a voltage or current different from standard line voltage is used, transformers or power converters or power supplies may be provided. When a building is either initially being constructed, or so thoroughly remodeled to provide adequate replacement of wires, the voltage may be generated in transformers that may even be provided outside of the occupied space, such as on the roof, in a utility room, basement or attic. In addition to other benefit, placement in these locations will further reduce requirements for air conditioning.

As efficiencies of light generation by LEDs are now beginning to surpass fluorescent tubes, such entire replacement is more economical. However, total replacement of such fixtures is not the only means contemplated herein. Any lesser degree of replacement is also considered in alternative embodiments. For exemplary purposes, the physical reflectors commonly associated with fluorescent fixtures may be preserved, and the fixture simply rewired to bypass any ballasts or starter circuitry that might be present. In this case, line voltage, such as 120 VAC at 60 Hertz in the United States, may pass through the electrical connector pins. LED base 205, in such case, may be designed to insert directly into a standard fluorescent socket, such as, for exemplary purposes only and not limited thereto, the standard T8 and T12 sockets used in the United States. In such case, either RGB LEDs 210-214 are arranged and wired to directly operate from line voltage, or appropriate electronics will need to be provided directly in LED base 205 to provide necessary power conversion. In yet another conceived alternative embodiment, power conversion may be provided through switching-type or other power conversion circuitry to alleviate the need for any rewiring, though in these instances the power conversion circuitry will need to accommodate the particular type of ballast already in place.

Where other types of fixtures already exist, such as standard incandescent Edison screw bases, LED bulbs may similarly accommodate the fixture. For incandescent replacement, no rewiring or removal of ballasts is required, since line voltage is applied directly to incandescent fixtures. Consequently, appropriate conversion may in one conceived alternative embodiment simply involve the replacement of a bulb with no fixture or wiring alterations.

For LED light panel 200 to replace an existing bulb, regardless of type, and benefit from the many features enabled in the preferred embodiment, communications circuitry must also be provided. This communications circuitry is necessary to properly illuminate each of the red, green and blue LEDs to desired color, to transport data through optical communication channel 300.

Figure 4:
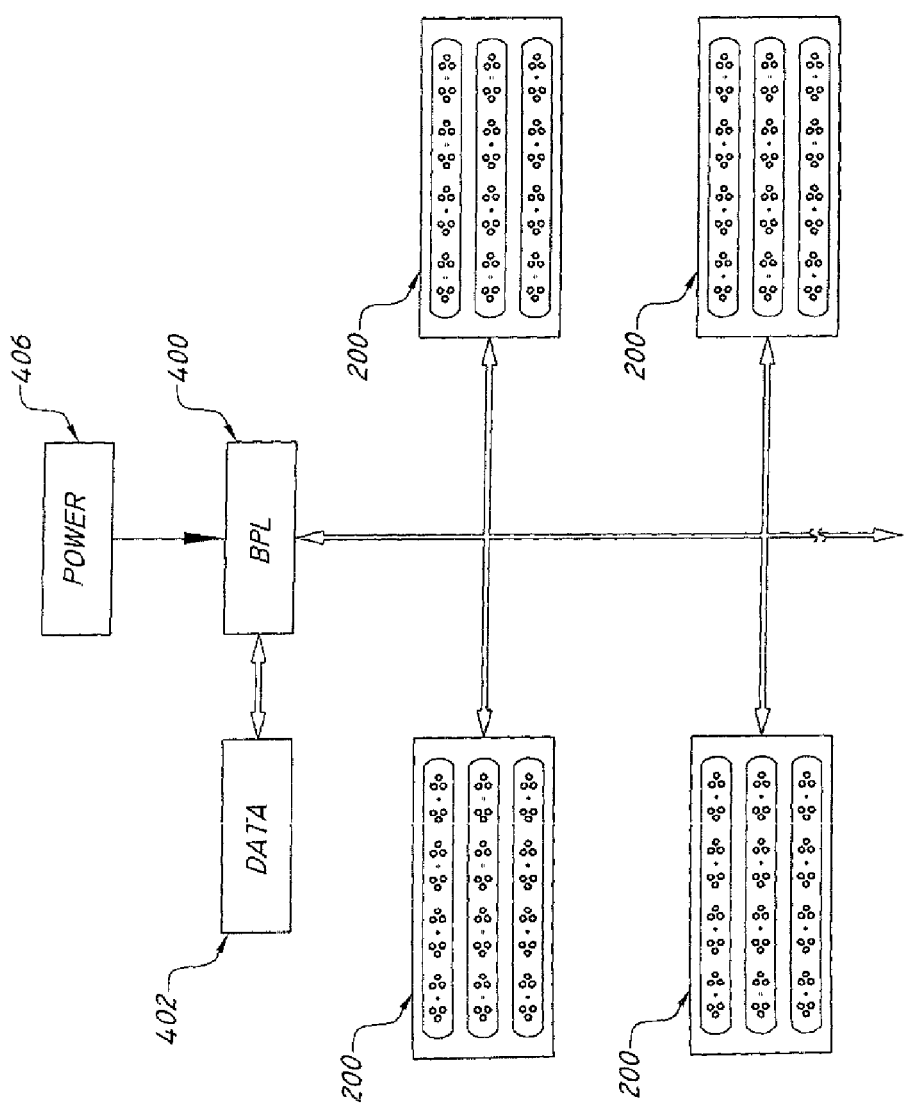
FIG. 4 illustrates by block diagram an electrical schematic of a host within an S-BPL communications system in accord with an embodiment of the present invention.

FIG. 4 illustrates a simplified block schematic diagram of an electrical circuit used to couple power and data to one or a plurality of LED light panels 200. Power 406, which may be either AC or DC current is coupled through a Broadband-over-Power-Line (BPL) integrator 400 with data 402, including identity, location, audio and video information, and various data signals. The data signals may arise through communications within a Local Area Network (LAN), sometimes referred to as an Intranet, owing to the common use of such a network entirely within an office space, building, or business. The data signals may additionally or alternatively arise through communication with a Wide Area Network (WAN), commonly describing a network coupling widely separated physical locations which are connected together through any suitable connection, including for exemplary purposes but not solely limited thereto such means as fiber optic links, T1 lines, Radio Frequency (RF) links including cellular telecommunications links, satellite connections, DSL connections, or even Internet connections. Generally, where more public means such as the Internet are used, secured access will commonly separate the WAN from general Internet traffic. The data signals may further arise through communications with the Internet. The origin of the data signals is not critical to the operation of the present invention, but may include various computer outputs such as might, for exemplary purposes, include control processor output or network connections such as commonly found on Local Area Networks (LAN), Wide Area Networks (WAN) or through the Internet.

Figure 5:
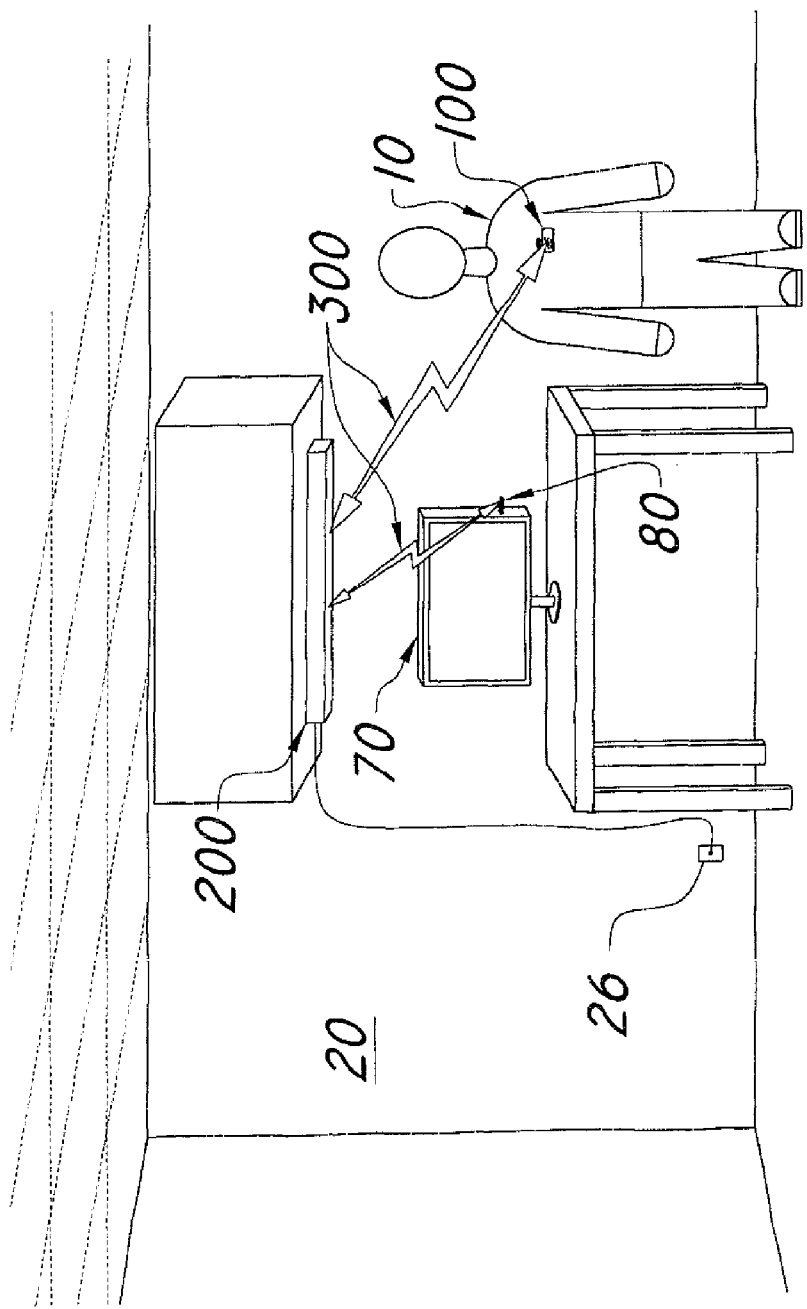
FIG. 5 illustrates by front environmental view an embodiment of a visible light embedded communications apparatus having a personal communications badge and optical dongle in communication with an LED optical light panel in accord with the teachings of the present invention.

FIG. 5 illustrates an embodiment of the invention similar to FIG. 1, but with an additional device serving as a client. As illustrated, in addition to badge 100, a computer 70 may further be coupled to a host 200 through an optical dongle 80. When more than one client is potentially coupled through a common host 200, and is potentially using the same communications channel therein as another client, known multiplexing or network communications techniques must be implemented. Among these, but certainly not limited thereto, are such techniques as static or dynamic assignment of unique communications channels, or Time-Division Multiplexing (TDM) of a single channel with appropriate collision resolution. Additionally, FIG. 5 illustrates the possibility of providing an outlet 26 coupling BPL signals or the like to a host 200.

Figure 6:
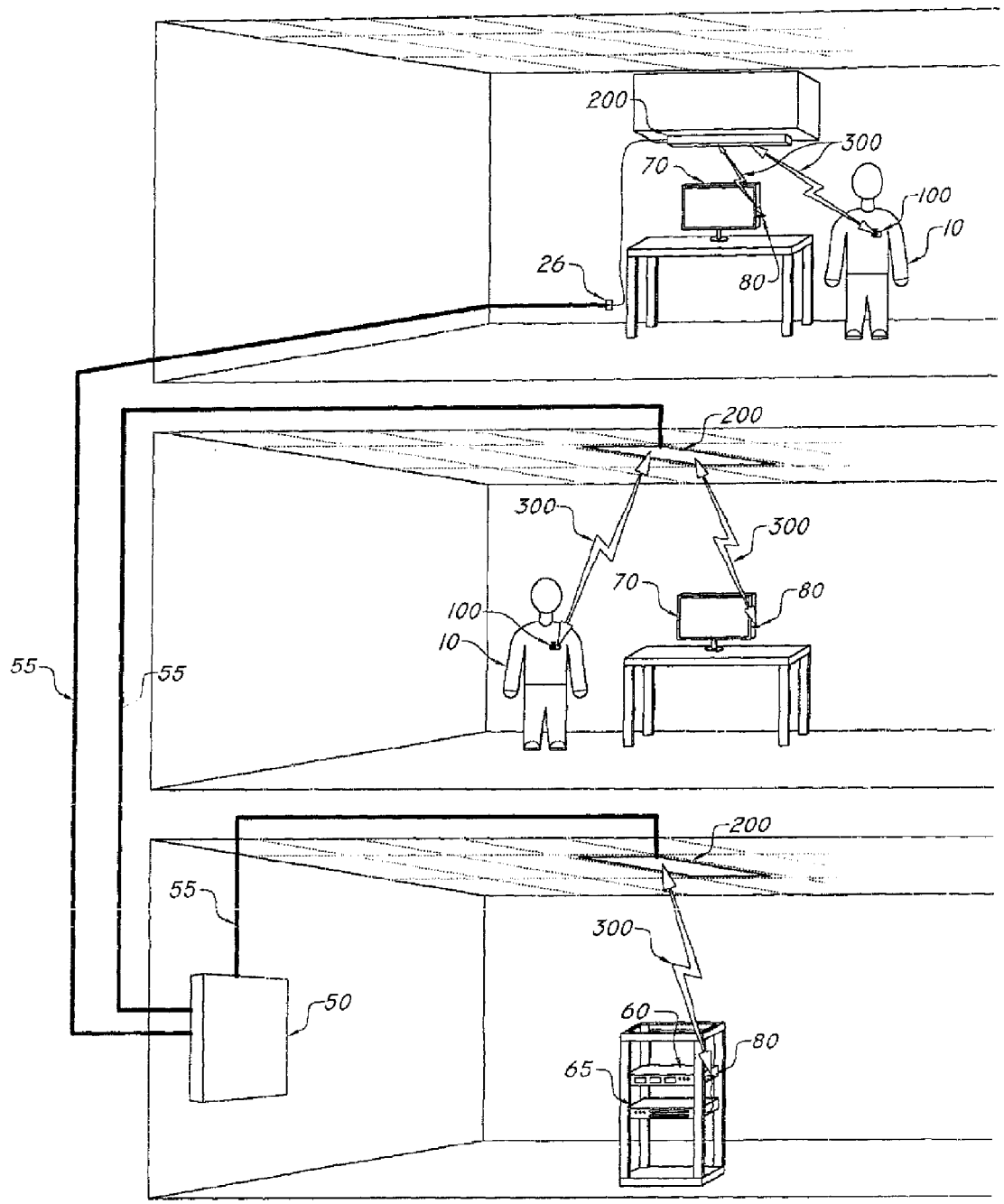
FIG. 6 illustrates by front environmental view an embodiment of a shielded visible light embedded communications apparatus implemented within a multi-story building in accord with the teachings of the present invention.
Figure 7:
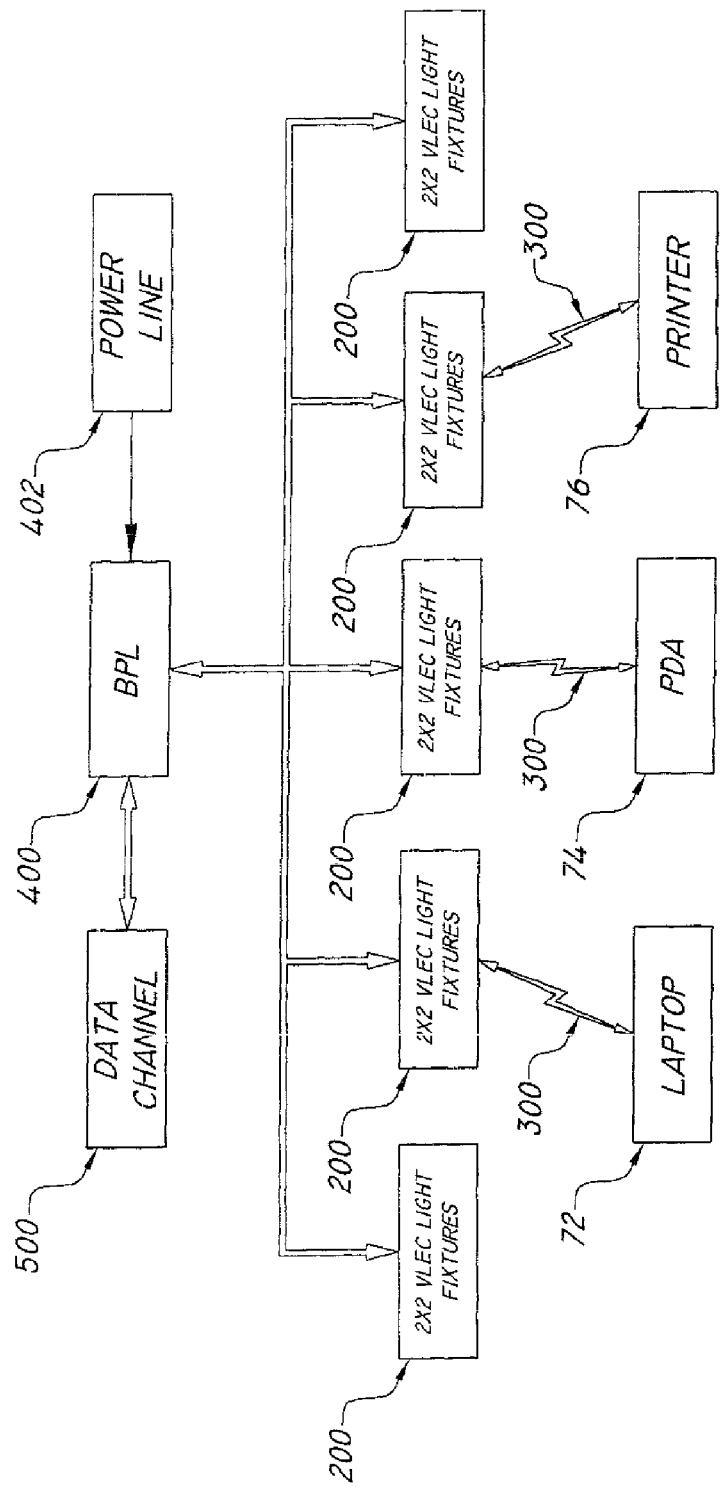
FIG. 7 illustrates by block diagram an electrical schematic of an S-BPL communications system including a plurality of hosts and clients in accord with an embodiment of the present invention.

As FIGS. 6 and 7 further illustrate, communication can further be shared with optically-enabled name tags 100, telephones, TV and music, Internet, public address, computing devices of all sorts, ranging from hand-held devices such as Personal Digital Assistants (PDAs) 74 to massive mainframe computers 60, and including Personal Computers (PCs) 70, 72, printers 76, network storage devices 65, building maintenance wiring such as thermostats, HVAC systems, fire alarms, motion detectors, and any other electrical or electronic apparatus existing or appearing within the room or space, other security and safety devices, appliances, manufacturing machinery, and so forth. Essentially, any device which incorporates or can be made to incorporate sufficient electronic circuitry may communicate with VLEC host 200 to exchange information at any time. Advantageously, many different conditions or devices may be simultaneously monitored and/or controlled when they are broadcasting information through the preferred network, because they are operating on a wide-bandwidth optical link. This information can be used anywhere on the network, which includes the other rooms or a central server.

In accord with a preferred method of the invention, LEDs are used to transmit through optical communication channel 300 several kinds of data, including identity, location, audio and video information. The use of an optical communications link provides large available bandwidth, which in turn permits multiple feeds of personal communication between LED light panels 200 and badges 100 or other clients in bandwidths similar to or in excess of that of cell phones. The optical data is transferred at rates far in excess of those detectable by the human eye, and so a person may not be able to detect any visible changes as the data is being transferred. Additionally, because optical illumination is constrained by opaque objects such as walls, the location of a badge 100 and associated person 10 can be discerned to a particular room, hallway or other similar space. In contrast, prior art GPS systems and cell phone triangulation techniques are typically only accurate to one or several hundred feet. Horizontally, this prior art precision is adequate for many applications. However, vertically several hundred feet could encompass twenty floors in an office or apartment building. The preferred embodiment, capable of precision to a room or light fixture, as illustrated in FIG. 6, therefore has much more exact pinpointing than previously possible. It can locate a person immediately, even in a large area and/or among a large crowd, and can keep track of a large population simultaneously. As noted, the large bandwidth permits video signals to be integrated with badge 100 location and movement, providing the opportunity to create audio-video records that are fixed in time and location.

Since location may be relatively precisely discerned, optical transmitter 130 or LEDs 210-214 may in one embodiment be configured to change color, flash, or otherwise be visually changed or manipulated to assist with directional guidance, personnel or intruder identification, energy management, or to facilitate the meeting and connection of individuals. To achieve these objectives, a building needs to be wired only for lights, saving a huge infrastructure cost of other wires and fixtures.

FIG. 6 additionally illustrates Broadband-over-Power Line (BPL) transmission of signals through an electrical distribution panel, such as a circuit breaker panel 50 or the like. Preferably, power line wiring from panel 50 is enclosed in conduit 55, thereby shielding the BPL signals to produce S-BPL (Shielded BPL).

In accord with the teachings of the present invention, a visible light transceiver can take many shapes and forms while still offering the duality of general lighting and communication. As FIG. 7 illustrates, one of many possible geometries includes a general 2×2 office VLEC lighting fixture 200 configured with LEDs. These installed fixtures 200 will be considered host fixtures for an internal network of communication.

The host fixtures 200 may be configured to manage the relationship of client devices associated with this technology. They can also manage peer to peer relationships to provide redundancy or act as part of an infrastructure void of multiple transport medium interconnects. The host 200 may provide intelligent packet analysis whereby false or inadvertent light photons can be discarded. The means of recognition or validation can be provided by multiple checks and verifications. The VLEC host fixtures 200 and clients will each be assigned a unique Machine Access Code and Electronic Serial Number. The Machine Access Codes and Electronic Serial Numbers will be assigned by the certified manufacturer's plant and matched against a unique relationship table residing on various certified servers. The client devices may then move about a LAN, an entire office building, a WAN or other network and achieve maximum throughput rates similar to that of the location they originated. An added benefit of the preferred visible light embedded communications comprised by optical communications channel 300 is that, with increased bandwidth, back end software for synchronizing data on PDAs and other mobile devices may be improved by almost 5 fold over RF applications as the transport mediums, changing the communications channel bottleneck from RF, and potentially with fiber optics becoming the new bottleneck.

Figure 8:
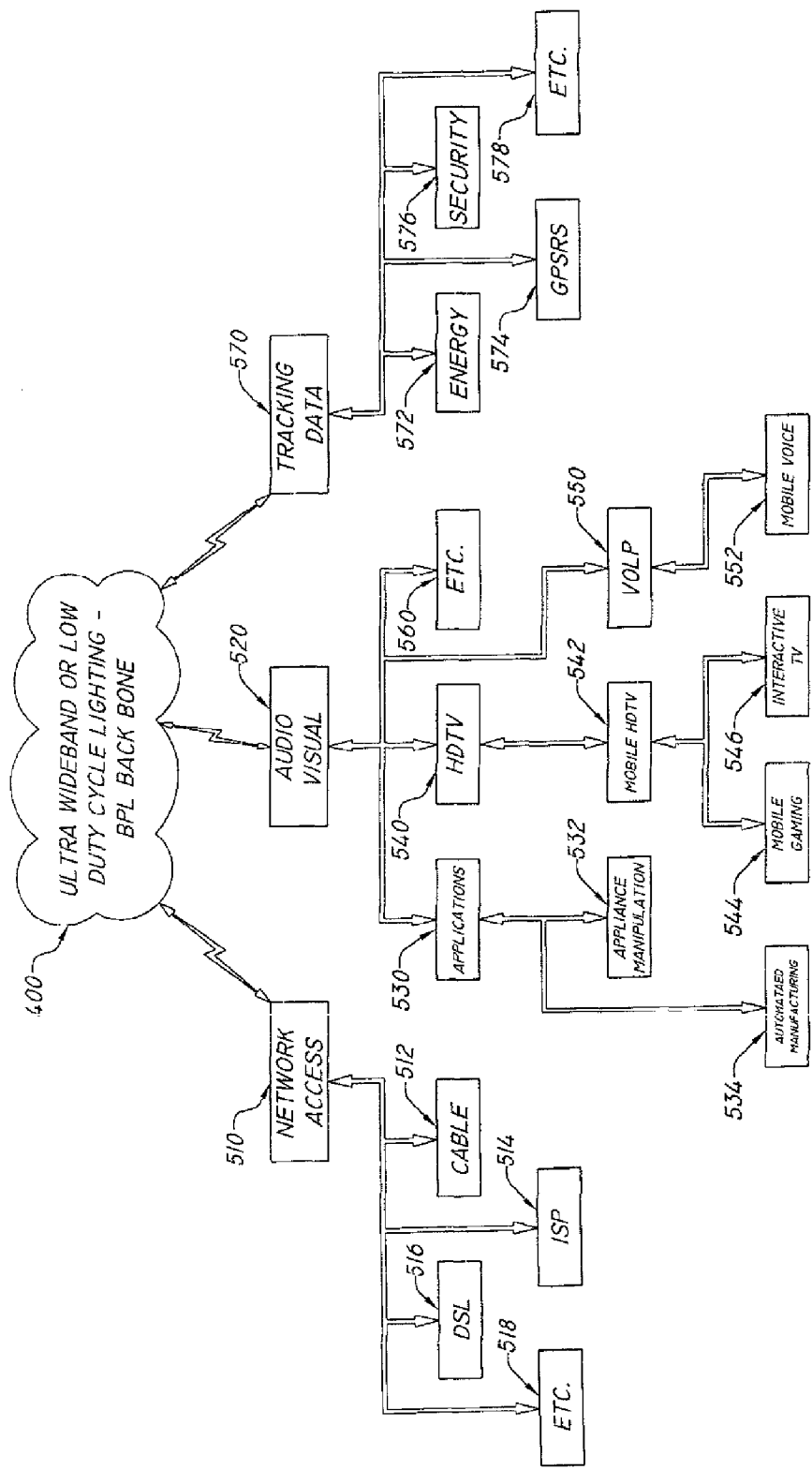
FIG. 8 illustrates by hierarchal chart an illustrative sample of the types of data communications to which the teachings of the present invention may be applied, either singly or in any combination.
Figure 9:
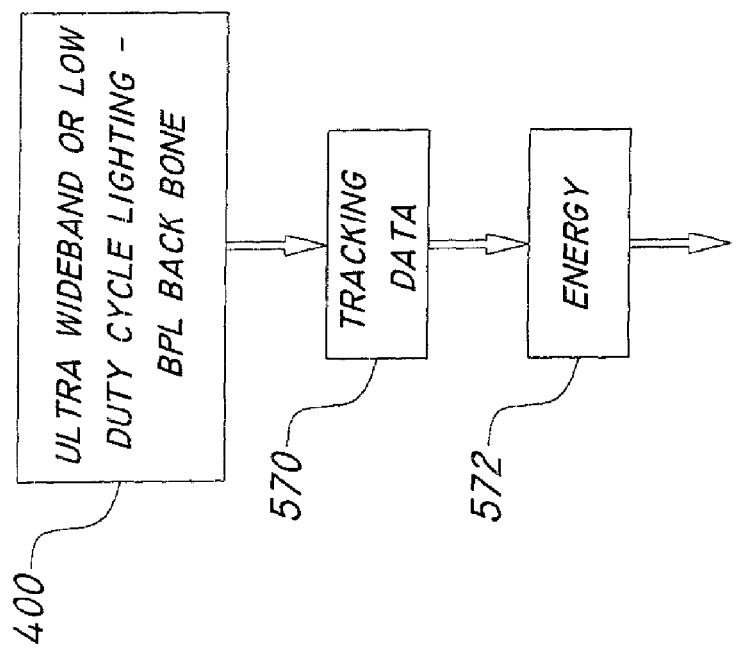
FIGS. 9-11 each illustrate by hierarchal chart a single application of the teachings of the present invention.
Figure 10:
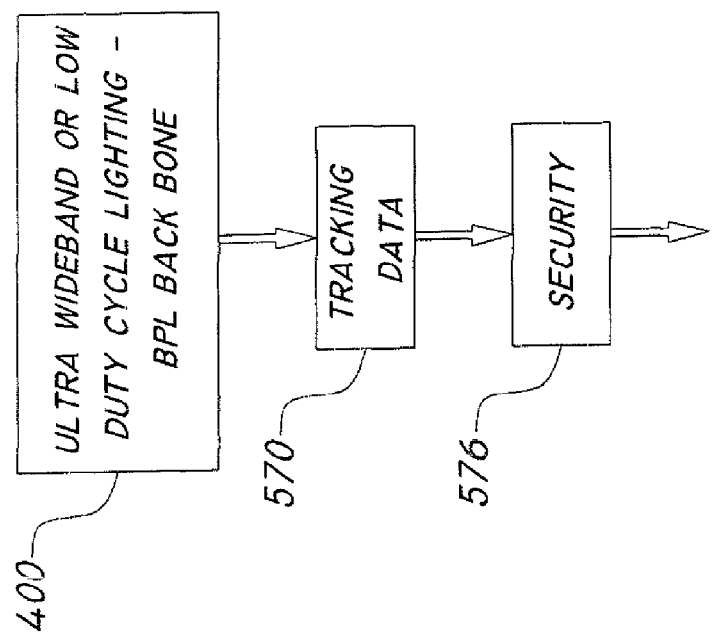

FIG. 8 illustrates many different types of exemplary communications that may be provided incorporating the VLEC technology of the present invention. Access to the World Wide Web will be enabled through network access 510 to allow users the benefit of web surfing. VLEC technology allows this access to be untethered and nomadic, even though beyond a building or space the network access 510 may be further coupled using conventional cable 512, Internet Service Provider (ISP) 514 links such as satellite or dial-up, DSL 516, or other suitable link 518. AV communications 520 may include various device interface applications 530 such as appliance communications or manipulation 532 and automated manufacturing 534. HDTV 540 is further contemplated, including mobile HDTV 542, mobile gaming 544 and interactive TV 546, but other types of video are additionally contemplated herein, including Slow-Scan TV (SSTV) or other known systems for capturing video information. Telecommunications and personal communications may further be enabled, for exemplary purposes using Voice Over Internet Protocol (VOIP) 550 and mobile voice 552. Other A/V applications are generically identified at 560. In another contemplated communications category, tracking data 570 may be gathered and used based upon the unique addresses assigned to VLEC host fixtures 200. The tracking information may be used for energy management 572, Global Positioning Satellite Routing Systems (GPSRS) 574, security 576, and other tracking applications 578. While communications are conceived as occurring between a plurality of hosts and clients simultaneously, in many instances one client will only be coupling one data stream at a time with a host. To better illustrate this, FIGS. 9-11 illustrate examples of single data category exchanges that might occur between a host and client.

Figure 11:
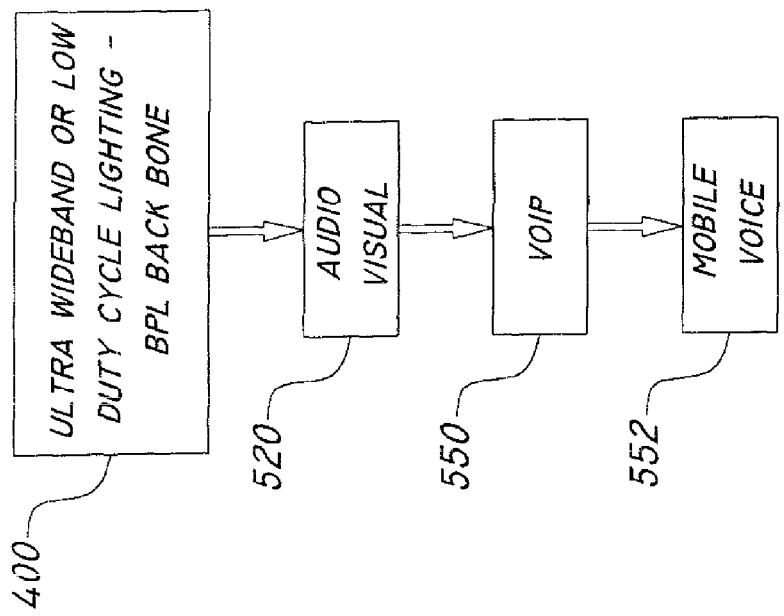

Considering FIG. 11 in more detail, and to better illustrate the depth of the present invention, core VoIP networks can be installed and integrated into the BPL network and provide a new form of untethered communications. A VLEC to Landline voice call can originate on a client VLEC device and if not connected to the wall can become mobile or nomadic as desired. This ability arises as the VLEC infrastructure would search for active, verified and validated clients in its network under layers 1 thru 4 of the well-known OSI model incorporated herein by reference, which include the physical, datalink, network and transport layers. These layers 1-4 are preferably insulated from the session, presentation and application layers 5-7. Certain Intelligent VLEC fixtures will provide the path to allow the origination of the voice call. As the VLEC client device moves from the originating fixture to the next fixture, the back end software will detect, verify and establish the channel for the client device to use. The distance of the client device will be measured according to the designed calculations of light photons according the engineering team for the best signal and when this is achieved an instruction to provide connectivity through this light is issued. In this case, our particular light will be referred to as the Edge VLEC. Multiple Edge VLECs are often designed into the network where voice calls are desired. The Edge VLEC fixtures will then hand off to the next VLEC source that is built into the relational database and continue the call. If the originating call moves towards a predetermined area that is considered outside of the VLEC coverage and the VLEC client device is capable of handling RF communications, then the call can then be set up to contact an RF carrier of choice and begin setting up the call as a cellular event. This would mitigate the amount of RF coverage required to provide a more robust voice cellular network. An additional feature unique to the VLEC technology with respect to cellular communications is the optional inclusion of an ultra-fast virtual location register that is integrated into various parts of the network, thereby reducing the latency inherent in today's cellular networks. A faster verification of electronic serial numbers is established in this database, thus improving on the time to re-establish voice or data connections. This ultra-fast virtual location register is part of the Virtual Location Register and Host Location Register will be integral in the voice and data communications.

If the originating call then wishes to establish a VLEC VoIP to VLEC VoIP call, the call would be handled by the IP network as a typical VoIP to VoIP call over the Extranet, Intranet or Internet as performed today. As the caller moves about the office, the IP network will again manage the call against light photon strength and, when conditions are met, hand off the call from one VLEC source to the next. As the call is torn down, the validation including digits dialed, origination source, destination source, port and IP address, type of client device, fixture device used for origination, type of call, duration of the call, charges if applicable for the type of call, circuits used if roaming onto the cellular network may all be stored into a data record similar to the call detail record of a standard telephone call. In regards to a pure data session, the VLEC client device will establish its connection through the VLEC light fixture which may be plugged into the wall and/or installed as a general lighting unit. The connection will be established upon the customary protocols of today, again using layers 1 thru 4 of the OSI Model. Once the connection is made, the client is free to move about within the confines of the designed network area while maintaining required throughput rates. As this device enters another area of multiple client devices being served by the VLEC technology, we see the bottleneck of this service developing on the back end infrastructure.

As home devices utilize this same technology, common replacements of incandescent bulbs with VLEC technology is anticipated, thus providing interaction similar to those applied in business.

The NTIA refers to devices as the following. Section 15.109(a), Class-A equipment includes devices marketed for use in a commercial, industrial or business environment, excluding devices which are marketed for use by the general public or are intended to be used in the home. Class B equipment includes devices marketed for use in a residential environment, notwithstanding use in commercial, business and industrial environments. The rules require Access BPL systems to comply with the limits for Class A or B devices depending on whether they are marketed for use in a commercial, industrial or business environment on the one hand or for use by the general public or in the home on the other. Under this Class A/Class B regime, Access BPL systems that operate on medium voltage lines external to residential environments are considered Class A devices. In one embodiment, a VLEC host 200 will interface with the majority of all medium voltage systems available commercially today. Referring to new lights as hosts 200 and mobile or nomadic devices as clients, VLEC technology can simply replace the last mile connection or interconnection for the clients' use. VLEC host 200 will house intelligence necessary to provide visually barely perceptible pulses of light for use by client devices. Environments and equipment sensitive to RF propagation will find benefit from this technology, as a VLEC host 200 will operate safely, and will not disturb or interfere with RF devices in the area. Certain metallic designs often prevent RF from penetrating, where VLEC can perform with success. By way of the present VLEC technology, the area of information propagated by LEDs may be more accurately confined or focused safely and without harm to the environment or humans.

Figure 12:
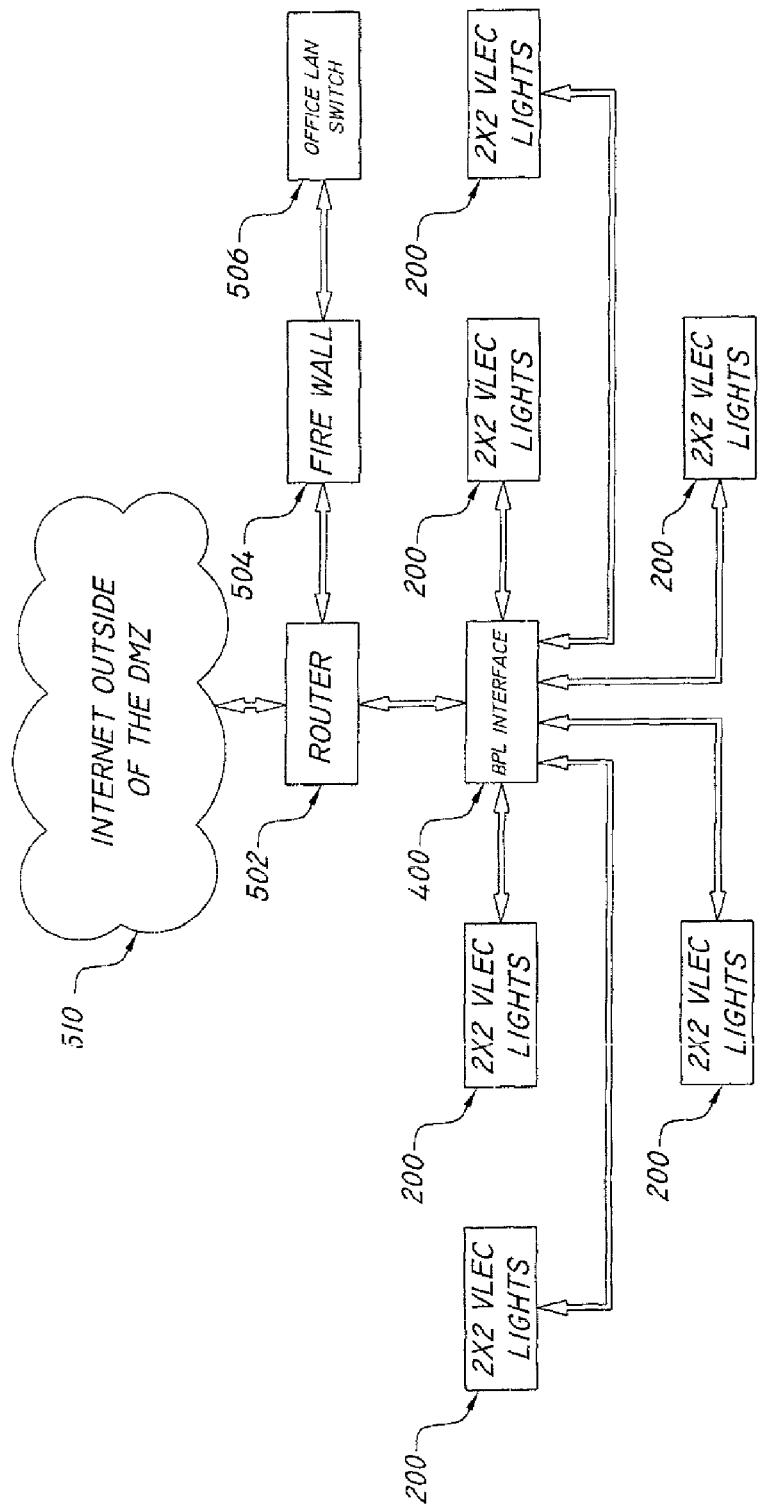
FIG. 12 illustrates by block diagram an electrical schematic of a BPL communications system including a plurality of hosts arranged in parallel in accord with an embodiment of the present invention.
Figure 13:
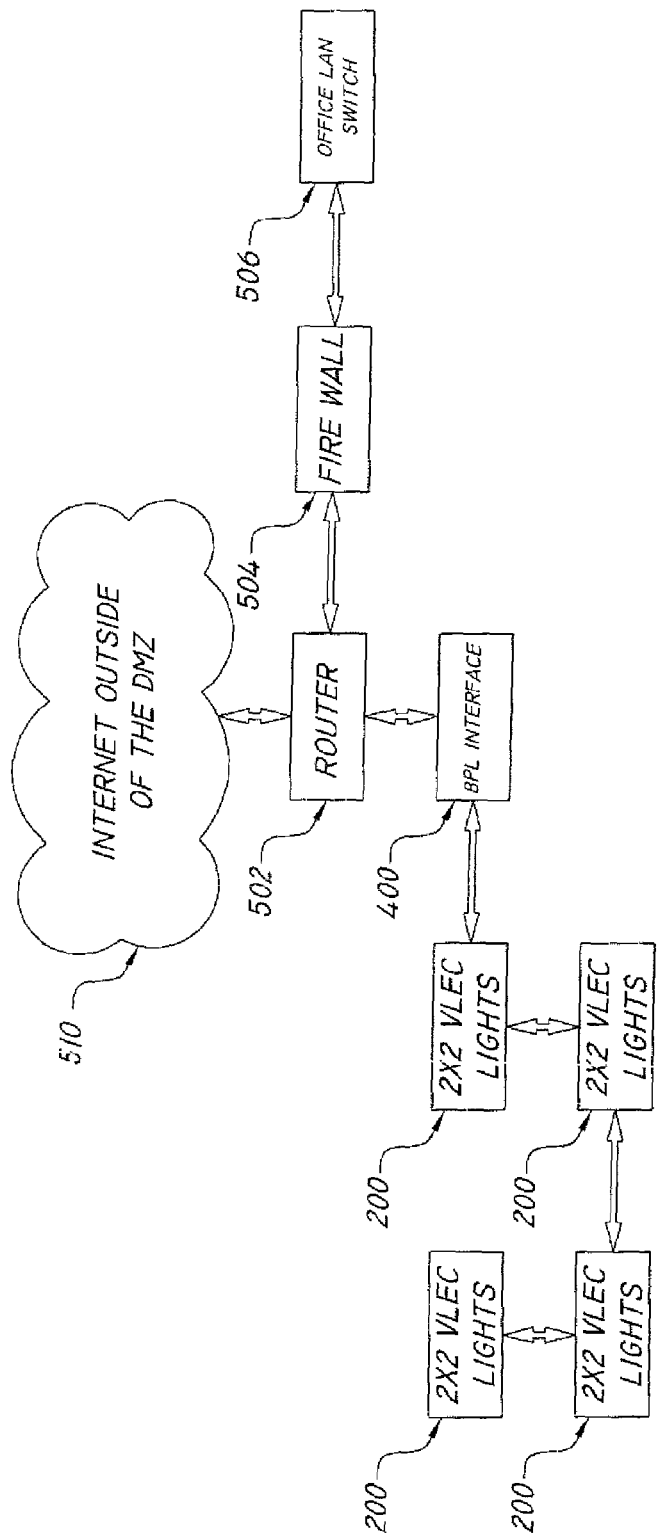
FIG. 13 illustrates by block diagram an electrical schematic of a BPL communications system including a plurality of hosts arranged serially and incorporating optical to optical transmissions in accord with an embodiment of the present invention.

FIG. 12 illustrates one possible configuration of network related components in combination with one possible configuration of VLEC related components. As illustrated therein, the Internet 510 may be accessed through a router 502, which might, for exemplary purposes, be coupled through a hardware or software firewall 504 to a standard office LAN and switch 506. While not illustrated, firewall 504 may also optionally be provided between router 502 and BPL interface 400. From BPL interface 400, a plurality of VLEC hosts 200 may be provided, each directly coupled to BPL interface 400. In contrast, FIG. 13 illustrates a plurality of VLEC hosts 200, only one which is directly wired to BPL interface 400, the remainder relying upon optical-to-optical communications between VLEC hosts 200. In other words, the present invention contemplates not only directly wiring each VLEC host 200 to BPL interface 400, but where desirable providing wireless VLEC communications between VLEC hosts 200, such that a communication from a client may pass through one or more optical-to-optical links before being coupled into a wired link.

In accord with one embodiment of the invention shown in FIG. 14 and similar to that illustrated and discussed with reference to FIG. 6, the wiring 410 between S-BPL interface 401 and LED light panels 200 is shielded by passing through a conduit 411 or the like and any appropriate junction boxes 412, defining a Shielded Broadband-over-Power-Line (S-BPL) connection that is both resistant to interfering communications and also produces almost no radiant energy.

Figure 14:
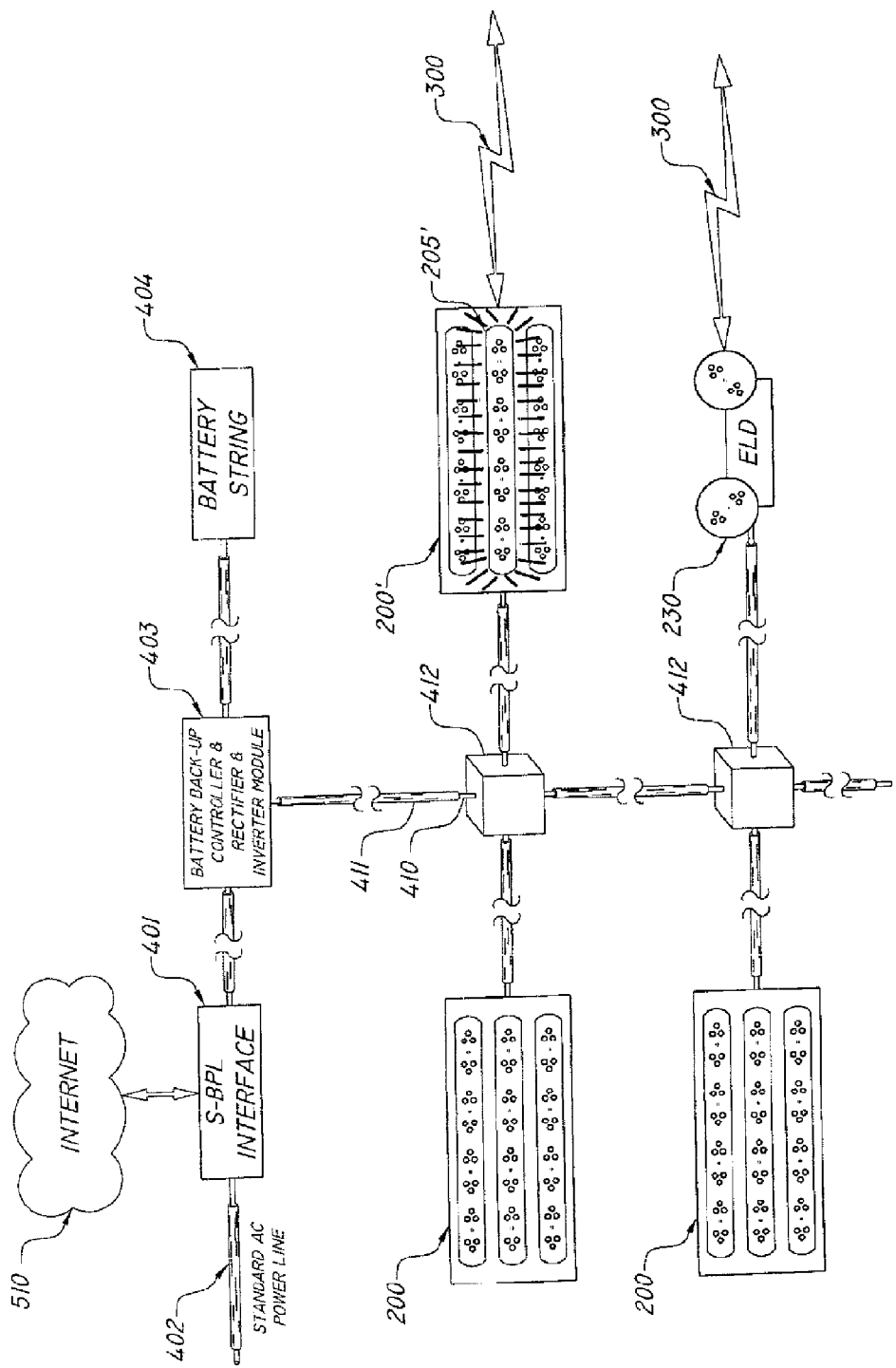
FIG. 14 illustrates by block diagram an electrical schematic of an S-BPL communications system including a plurality of hosts and further having an emergency illumination and embedded communications mode and apparatus in accord with an embodiment of the present invention.

The present invention illustrated in FIG. 14 also has the capacity to provide low power communications for energy management, emergency back-up, security and special applications utilizing alternative power sources such as batteries 404 or solar cells. Since each individual LED light panel 200 may be separately controlled, unnecessary lights may be extinguished in an emergency. Remaining lights such as LED light panel 200' through a single illuminated substrate 205' may be used to signal emergency routes which may be emergency exits, predetermined shelter such as in the event of a tornado, safe locations potentially determined in real time in the event of an intruder or other hazard. The remaining lights may also or alternatively be used to maintain nominal communications channels within the building. The signals in such instance may be unable to be carried through power lines, and so may alternatively be implemented through an optical-to-optical repeater function from one light to the next such as described with reference to FIG. 13, to travel entirely through a chain of LED light panels 200. Additional Emergency Lighting Devices (ELD) 230 may also be controlled by a suitably designed battery back-up, controller, rectifier and inverter module 403.

While bandwidth may be relatively limited in the case of open wiring interspersed with other wires or adjacent to other sources of EMI/RFI, several additional circumstances may pre-exist or may be provided to boost the bandwidth of a system designed in accord with the present invention. In one embodiment, all or many BPL wires are shielded within a conduit 411 or other suitable shielding, most preferably for the entire distance between BPL interface 401 and each VLEC host such a LED light panels 200. Such shielding results in the preferred S-BPL communications channel, which is anticipated to have higher bandwidth capability than provided with open and unshielded wires.

Relatively recently, artisans have also proposed using so-called E-lines for extremely high bandwidth, low attenuation transmission. Such transmission schemes are, for exemplary purposes, proposed in U.S. Pat. Nos. 6,104,107 and 7,009, 471, the entire contents of each being expressly incorporated herein by reference. While the present invention is fully operational using known or well-established transmission techniques and resulting bandwidths, and so is completely independent of whether these E-line transmission techniques work and are applicable or not to the present invention, the present invention further contemplates improvements to bandwidth using useful and functional transmission techniques and the incorporation of the same where operationally suitable.

Figure 15:
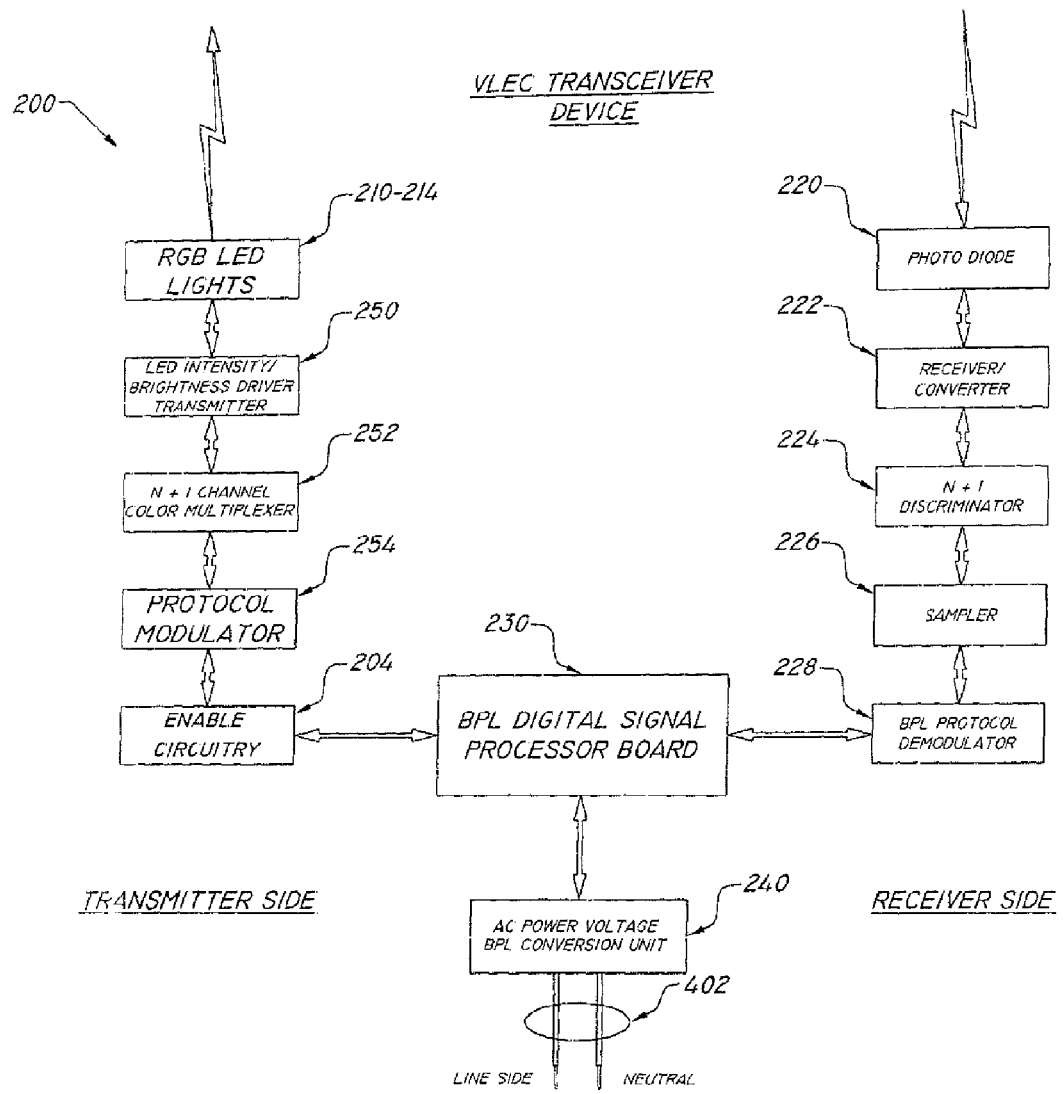
FIG. 15 illustrates by block diagram an electrical schematic of a VLEC transceiver in accord with an embodiment of the present invention.

FIG. 15 illustrates that a Visible Light Embedded Coded (VLEC) System features can include the responsibility for the validation of client devices by means of recognizing the client, then verifying the client against a small integrated relational look-up table. If the client device is foreign to the VLEC fixture, a verification request is then sent to a certified and redundant host core recognition service outside the network. This is similar to today's telecommunications networks. The client devices can be activated and de-activated by many forms. One such way involves 2 steps.

Step one is to power on the device. Step two is when the device must be authenticated and validated by the host look-up tables, which will provide permission levels depending on the requirements. The result of an unauthorized device will activate several processes. One, deactivate the client or host device. The second is to relay real-time location information about the device to the proper authorities.

An S-BPL transceiver 200 is provided to receive and transmit data from/to the S-BPL enabled electrical circuit. The particular interface implemented may vary. Currently a number of existing interfaces could be used, such as Universal Serial Bus (USB), Ethernet, Media Independent Interface (MII), etc, and the particular choice of interface could further depend on the S-BPL transceiver used, as will be apparent to those skilled in the art.

A Digital Signal Processor or the like 230 is provided for program control that can transmit/receive data to/from BPL communication network 201 through BPL transceiver 200. the Digital Signal Processor in an embodiment may respond to commands received on a network through S-BPL coupling 240 to manipulate enable circuitry 204, and may also issue commands or send data to network 201 if needed. If the transmit portion of enable circuitry 204 is enabled, these commands/data will also be passed to the optical link.

Enable circuitry 204, may in one embodiment be enabled to turn on or off the LED optical transmitter 250, as well as change the characteristics of the light, such as brightness and even color mix when multicolor LEDs are used. This is useful for things such as decorative lights, annunciators' or an emergency light, which may provide a visual indicator for things such as tornado, lock-down, fire, movement, etc. The Digital Signal Processor circuitry 230 may also manipulate the ability for BPL or any other medium transport known arts of communication network 201 to send and/or receive data to or from another adjacent optical link. This feature would provide the ability for the VLEC host to act as a client as well.

Driver circuitry 250 and LED(s) 210-214 will pass any signals to any optical link for other devices designed to communicate. Driver circuitry 250 may, in the preferred embodiment, simply be appropriate buffering, isolation, modulation or amplification circuitry which will provide appropriate voltage and power to adequately drive LED emitter 210-214 into producing a visible light transmission. Exemplary of common driver circuits are operational amplifiers (Op-amps), transistor amplifiers AND gates and NAND gates, though those skilled in the art of signal conditioning will recognize many of the optional circuits and components which might optionally be used in conjunction with the present invention. Also, it is desirable to use a modulation scheme with the signal so as to provide the intended design of duality as a general lighting fixture. The transmit circuitry may have to provide a means of modulation in this case, also preferably incorporated into driver circuitry 250. The type of modulation will be decided using known considerations at the time of design, selected for exemplary purposes from FM, AM, PPM, PDM, PWM, OFDM, and other derivatives of QAM schemes in the known arts.

Similar to but preferably complementary with the transmission circuitry, receiver circuitry 222 receives data from the optical link detected by photo sensor 220. Receiver circuitry 222 will appropriately amplify, and may further convert a data bearing electrical signal into Binary or Digital pulses. As but one example of such conversion, receiver circuitry 228 may additionally demodulate a data bearing electrical signal, if the data stream has been modulated by an optical host. A suitable sampling circuitry 226 and discriminator 224 will condition the data bearing electrical signal to yield appropriate and pre-determined information as a received data signal. The data bearing electrical signal is then demodulated by 222 and passed onto the DSP circuitry. From here the signal will contain protocol and payload packets that will propagate back onto the BPL Medium infrastructure via known art applications.

Figure 16:
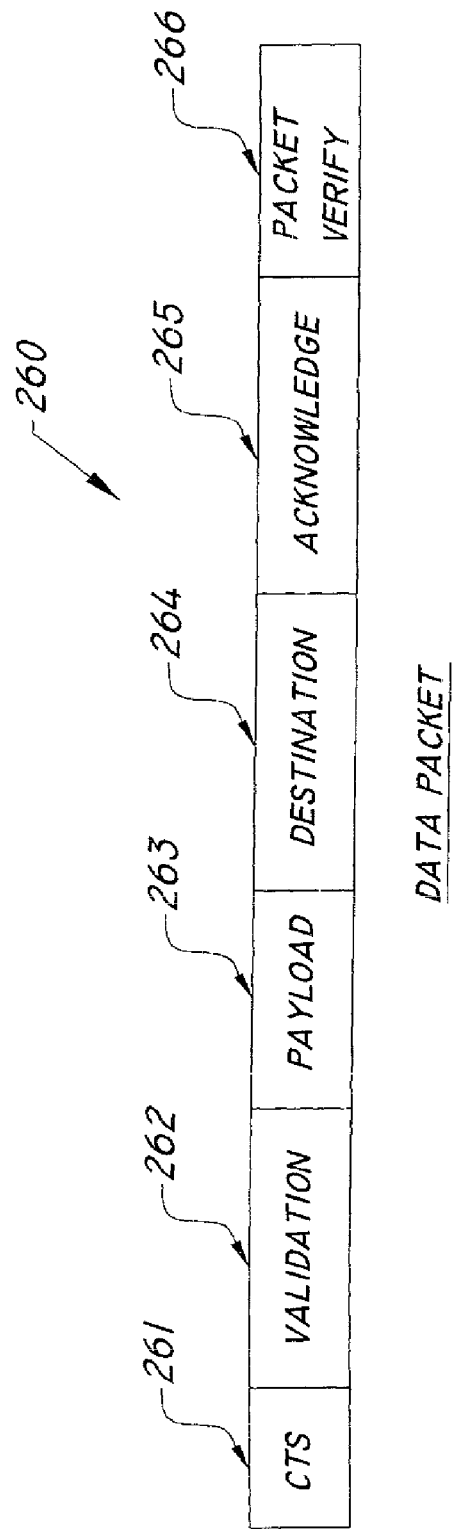
FIG. 16 illustrates by block diagram an embodiment of a data packet in accord with an embodiment of the present invention.

FIG. 16 illustrates a sample data packet 260 that might for exemplary purposes be used to communicate data through a preferred VLEC apparatus. Data packet 260 might include a CTS (Clear To Send) header 261, followed by validation 262. The main data content will be carried within payload 263, followed by a destination identifier 264, acknowledge 265, and packet verify 266. These components are well-known to those skilled in the art of data communications and will not be further repeated herein, as the exact content of the data packets is not critical to the invention, nor necessary to enable those reasonably skilled in the field.

FIGS. 17 and 18 illustrate different VLEC pulsing schemes 270 and 280, respectively, depending upon desired visible illumination levels. FIG. 17 illustrates a series of pulses 271-276 which, if averaged, are generally illuminating an LED through more time than not. The human eye produces a chemical process that averages the amount of light through time to provide descriptive visions interpreted by the brain. With enough pulses of long enough duty cycle, the human eye will discern illumination. The level of illumination can be controlled by amplitude or duty cycle variations, as may be preferred, preferably selected in such a way as to not interfere with a particular data modulation scheme.

In contrast to VLEC pulsing scheme 270, the ultra-low duty-cycle lighting communications pulsing scheme 280 of FIG. 18 intentionally reduces the duration of each pulse 281, 282 relative to the duration 283 between pulses. This in turn substantially reduces the duty-cycle, and can be used to dim or visibly extinguish an LED, while still providing communications through the LED. When extinguished, the duration of a pulse is shortened just enough to provide space for valuable information and the time between pulses are extended adequately to be undetectable by the human eye.

Ultra low duty cycle lighting technology can work positively by continuing to provide critical data to networks and people. With the appearance of being turned off, the lighting network can continue to communicate information. A second valuable trait is the very low energy consumption of this technology. This can be useful in a power outage, and so might preferably be implemented in combination with the apparatus of FIG. 14. The ability to communicate information in dark rooms is further beneficial as part of a energy conservation effort, since less energy is being used for illumination. Further, this ability may be very beneficial with regard to security, since an unauthorized person entering a room will not trigger light to become visible until that person or entity is removed. Further, if the unauthorized person brings a portable illumination source such as a flashlight, optical detector 220 may detect the additional illumination and signal unauthorized presence.

While the foregoing discussions reference the illumination of a single LED or RGB LED, further contemplated herein is the separate control of a large number of LEDs. In such case, where full illumination is desired, several LEDs may be providing the same, while a separate LED handles communications. Likewise, in the case of an ultra low duty cycle demand, communications may be divided among a plurality of LEDs, thereby reducing the on-time percentage required within any individual LED, thereby permitting more data to be transferred without perceptibly increasing the illumination level from an individual LED.

Exemplary Applications

As illustrated in FIG. 8, the present Visible Light Embedded Communications technology is applicable to a very large number of quite diverse applications. The present discussions are presented as more extensive, but purely exemplary illustrations of how VLEC may be applied in different situations and in different industries.

In the field of energy management, controlling lights, HVAC and the like are easily recognized using VLEC technology. However, energy management is not solely limited to total power consumption. Peak inrush current is also an important factor monitored by many utility companies. This is the peak power draw of the power customer, for exemplary purposes within each twenty-four hour period. By controlling the timing of illumination and other equipment start-up, electrical draw may be gradually ramped up. Many devices initially draw more power at start-up than when operational. So, since each light is individually addressed and controlled and appliances or machines may similarly be controlled, the communications afforded by the present invention permit much smaller banks of devices to be started, allowing those devices to surge and then settle to lower energy requirements before starting the next bank of devices. Some devices and machines very quickly drop down to lower power draw. Even LED light panels 200 which serve as VLEC hosts are such a device. Banks of these may very quickly and sequentially be started. Other devices, such as electrical compressors found in heat pumps, refrigeration and air conditioning units, may require much more time for start-up, before additional devices should be started. Likewise, the particular order of start-up may be optimized for the various electrical loads found within a building. All of this is readily accomplished through simple programming and communication through preferred LED light panels 200 or equivalents thereto.

In other embodiments of the invention, numbers of occupants within a space may be used not only for anticipating illumination, but also to control operation of other appliances and machinery within the building. Exemplary of this, but not limited thereto, are water and space heaters and coolers, and all other electrical or electrically controllable devices.

Security

In accordance with another alternative embodiment of the present invention, building lighting may be modulated with time and date stamps or the like. Video recordings made within the space of modulated illumination will have an optical watermark automatically embedded therein. The embedding of such identifiable signals ensures the integrity of video recordings made under these lights.

Building management in accord with another embodiment of the invention may further include automated secured access control to apparatus such as doors, drawers, electronic computer operations, cars, thermostats, and any other devices that may be electronically controlled. By means of LED communication, the location of unauthorized devices as well as persons can be tracked or polled by the system. Doors, either locked or unlocked, can be manipulated in response to the location or movement of these devices or persons.

When applying VLEC to tracking data as illustrated in FIG. 8, there exists a need to monitor assets throughout their journey. Intelligent tracking of client devices is applied by following a product, client device or asset through an infrastructure. An asset may be created and assigned a unique identifier only known by the manufacturer and the purchaser. The asset or entity will then be shipped to the purchaser and while in transit can be monitored by VLEC technology. Any unauthorized activity by an entity can be immediately assessed by security personnel. The exact location of the unauthorized incident will be known by the security system. Information containing the time, date and photo of the entity can included in the description field of the software. This information will then be conveyed via data broadcast practices across all channels associated with available infrastructure, whether within or exterior to a building. A video signal may further be employed through the VLEC infrastructure as well. Security cameras can additionally utilize the VLEC infrastructure.

If audio and/or video is additionally enabled, either through communications badges 100 or separate wall-mounted devices, the video can be used to capture the last-known conditions of a user or an area. This can be important in the event a disaster strikes that results in significant destruction of property or life.

In the event of an unauthorized presence, and in accord with another embodiment of the invention, the present preferred apparatus may be used to detect and locate the unauthorized person or object. When a building is dark, in many cases an intruder will rely upon a flashlight to move through the building. Most preferably, an optical detector will detect this unidentified light source. In such case, since the location of the optical detector is known precisely, the location of the intruder is also known. Further, even as the intruder moves about, so the intruder will be tracked by virtue of the light emitting from the intruder's flashlight. General room lighting may intentionally be disabled if an unauthorized person enters into an area. The lighting switch may be disabled, rendering the room less accessible.

When emergency personnel are called to the building, LED optical transmitters 210-214 may be used to guide the emergency personnel to the exact location of the intruder. The emergency personnel may not be limited to police. As may by now be apparent, ambulance workers as well as police would appreciate flashing directional lights because quicker access to an emergency scene could potentially save lives. This custom guidance system can include red, white or other suitably colored or illuminated lights which may be steady or flashing for emergency situations.

Unauthorized vehicle access may be prevented or enforced by applying VLEC technology to automobiles. When a certain automobile enters into an area that cannot be penetrated by RF signals, VLEC technology will alarm appropriate personnel. All of this information is again stored in several certified databases for reference and look-up. The information in one database just a portion of the entire profile needed to validate the vehicle.

The present invention can additionally improve on today's "intelligent vehicle occupancy" services in many of today's vehicles by offering the advantage of appending to the motion detection technology with VLEC Ultra Low Duty cycle communications. The owner of a vehicle may be made aware of someone occupying the vehicle while the owner of the vehicle is still in a known location. The information would traverse a VLEC Ultra low duty cycle communications channel from the vehicle to another VLEC Host fixture in the garage or other vehicles, then traverse BPL infrastructure back to the office building where the location of the person is already known. Because of GPSRS technology described herein below, a reference or look up table may identify the exact location of the VLEC Host fixture and the exact location of the person that owns this vehicle, and alert the VLEC client device.

Building Alterations or Remodeling

Using access or in-house BPL infrastructures, the present invention can utilize existing building wires to propagate information thus reducing or minimizing the need for costly capital upgrades. Furthermore, light colors, color temperatures, and light selection may all be controlled via software. Consequently, many alterations or remodeling may simply be or result in relatively minor software revisions. With proper placement of suitable fixtures at the time of construction, no new illumination or communications wiring or fixtures will need to be provided, permitting extreme flexibility using primarily off-the-shelf components.

Outdoor Applications

The embodiments illustrated herein are generally complimentary for indoor or outdoor use. In outdoor use, existing street lights and older incandescent traffic lights may be exchanged with modern LED lighting, enabling intelligent roadway systems using BPL or other information transportation mediums. Similar to indoor lighting designs, the street lights may provide an information infrastructure within themselves as the VLEC technology is incorporated into them, thus providing a private or secure form of information transfer. Existing metropolitan street lights are used to complete network design communications to the everyday intersection, thus alleviating the need for extensive fiber optic cables to achieve the same results. Information assignment may additionally be controlled to specific areas, unlike Radio Frequency communications. Massive bandwidths of information are available at every intersection, providing commercial, law enforcement and consumer needs and/or requirements. Moreover the cost for deployment is lower than alternative technologies, as the present invention is used for both information and providing areas of lighting at significantly reduced capital cost verses the return on investment. Core network infrastructures will be improved by using the VLEC technology and replacing huge amounts of cables on the back end of the IT control rooms.

Law Enforcement

Law enforcement and their effectiveness have always relied on the improvements of technology. Vital information, crucial to their role, has improved considerably over time. Unfortunately, today's law enforcement does not excel as much in certain areas since it relies primarily on the same medium principles and networks shared by the general public. Again, capacity restraints or bottlenecks reduce the overall effectiveness for law enforcement as the government strives to make more frequencies available to meet consumer demands. Vast amounts of available light frequencies, with the ability to quadrant off chunks specific to a government agency using the technology, provides much new and unallocated bandwidth. One example is the use of human aid signaling devices. An infrastructure consisting of VLEC devices in a suburban environment can aid emergency personnel by providing porch lights that serve dual roles as both general illumination and an emergency assistance locator and directing emergency official directly to the location with greater accuracy.

Construction

Construction zones will be made safer by use of the Visible Light Embedded Communication by enforcing the speed within construction zone areas. This can be accomplished using existing solar powered devices integrated to a VLEC device on a stick that can communicate back to host control centers located somewhere nearby. The VLEC technology may further be incorporated into automobiles. As vehicles enter into a construction zone, the speed limit may then be communicated to the vehicle and either signal to the driver the reduced speed, or actually limit the vehicle to that speed. The vehicle will then be either more likely to be passing through at the required safe speed or in fact be limited thereto, thus reducing injuries to construction workers and pedestrians.

Excavation sites are sensitive to spurious RF signals which present a significant safety hazard thus limiting potentially valuable communications in the area. Mining areas also present an increase in safety hazards with RF controlled devices. The present VLEC technology presents no hazards to such environments. VLEC technology applied to new mining devices will provide a increase in computing power and make for lighter, safer equipment by reducing or alleviating all communication cables.

Guidance

Intelligent roadways may be constructed using LEDs and eventually incorporate the present VLEC technology. This will permit sufficient bandwidth to provide more precisely mapped road ways, and provide the foundation for improving traffic management by alerting drivers and emergency personnel of an accident or other traffic matter before they may come upon it. This information can then be transferred to the driver who would have the option of getting off at the nearest exit or begin slowing down the vehicle with a distance calculation device present in the vehicle and providing them with the exact location of the accident. The driver may even opt for the automated version of having their vehicle put into a safe driving mode and apply the brakes for them if they are within close proximity of the accident.

Parking lots and garages may additionally have VLEC host fixtures attached so that client devices that are attached or carried by some form can intelligently assist and remind a driver of the exact location of a vehicle. Illumination schemes may be provided to further assist in the identification that can range for exemplary purposes from specific colors showing a path to the vehicle, to selectively illuminating vehicle lights, to user name activation when the user is within the pre-designed proximity of the vehicle.

Medical

Even with today's advances in Radio Frequency technology there still exist certain precautions in the medical field. Spurious RF emissions tend to interfere with sensitive medical equipment. Procedures involving Magnetic Resonance Imaging continue and X-ray practices would find valuable uses with this VLEC technology by alleviating bulky information cables associated with today's design. This would save on valuable floor space in today's hospitals facilities. The majority of medical field could utilize this VLEC technology by integrating with BPL technology. Hallways and areas of low population could have their lights governed, and thus reduce annual operating expenses by employing this as an energy management solution. Medical equipment will be able to take full advantage of VLEC technology coupled with BPL infrastructures as this intelligence is integrated into the operational methods of the equipment.

GPSRS

Today's satellite navigated Global Positioning are augmented with the use of GPSRS. The burden on GPS satellites may be reduced by embedding unique identifier information and pre-documented exact location of an entity or asset. This GPS-based location may then improve location-based services by providing real time location. Today's satellites update a location every 3 seconds. The information about the location of an entity or asset is always referenced back to a remote reference table. Current location measurements using satellites also require 3 or 4 satellites to improve the triangulation methods needed for locating a place or entity.

Location based services within a VLEC infrastructure will have the added advantage of improved and secure content. One example is a consumer shopping mall where general consumers can walk around and discover the exact location of the goods or services they need. This is accomplished by simply providing a portal for any business to place information about their goods and services. The information is then incorporated into the BPL infrastructure by means of application controlling devices which link to the overall office or place of business VLEC grid. Another is in a major office complex where security personnel can identify personnel in other offices as they patrol the grounds by simply having the information provided to them in real time. With all business personnel having an assigned badge with VLEC technology, we can locate individuals in meetings and alert them if needed. Personal Navigation devices will have the added advantage of providing improved coordination and collaboration methods by providing an increase in friend to friend location services. A friend to friend location services is an optional service where by a personal list of friends or family members equipped with VLEC technology GPSRS devices can be created in a data base and that data base is managed by the group participants. When needed they utilize a VLEC GPSRS client device that associates with a VLEC host and then with a connection of some form through a controller in the home that connects or interfaces over BPL to the Internet. The information will then traverse the Internet and arrive at the predetermined location based on a designed collaboration (containing all Internet protocol addresses subnets and ports designed for this purpose) by the friends involved to create this network. The controlling device will contain reference, relationship, awareness or look-up tables and establish in a millionth of a second, the location of the entity they are seeking. A separate database is compiled by businesses that opt into this services similar to today's location based services can provide the user with a given experience sought after by the business. (sales of goods or services). This information is then embedded or encapsulated into the data stream and transceived throughout the Internet. Today's cumbersome RF calculations require algorithmic math computations that are constantly changing and therefore reduce the accuracy of locating the device in real-time. A reference back to the previous or last known location require constant updates. Couple this with the inherent latency's of today's devices and effectiveness is reduced. Based on RF applications, there may be a need to measure the RSSI (radio signal strength indicator) and relate this information to another calculation table before we can apply probable table coordinates in order to perform a triangulation calculation of the client device. The RF Location based services rely heavily on assisted GPS technology. This technology is very taxing and expensive on computers, and contributes to a poor economy of scale approach for businesses. GPSRS will embed location information.

As may now be apparent, ultra high throughput at the last mile device is attained by VLEC augmenting methods that will prove more cost effective than any other solution available today. The present invention expands areas of network access to include a more vertical growth in current mature technologies. VLEC coupled with BPL and Ultra Low Duty Cycle lighting will extend the often limiting capabilities of Ethernet, USB and Wifi. Ethernet's primary focus has applied to a network consisting of wires. USB has simplified network connectivity. The legacy of RF is the most challenging in that RF is not easily controlled and the technology of various standards have matured to the point where deployment cost are essentially a race to the bottom. Increases in revenue for all applications will stem from the benefit of having majority control over 90% of the core network environments, first and last mile transportation, and end user products.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

What is claimed is:
1. An LED light and communication system comprising:
at least one optical transceiver comprising at least one light emitting diode and at least one photodetector attached thereto, said at least one light emitting diode generating light as illumination, said illumination comprising a plu- rality of flashes of illumination, said flashes of illumination not being observable to the unaided eyes of an individual; and a processor in communication with the at least one light emitting diode and the at least one photodetector, the processor constructed and arranged to regulate said plurality of flashes of illumination to generate at least one communication signal embedded within said illumination, said at least one communication signal comprising at least one optical transceiver location identifier, wherein said at least one optical transceiver is in communication with a broadband over power line communications system, said processor being further constructed and arranged to receive at least one broadband over power line communication signal from said broadband over power line communications system and to transmit said at least one broadband over power line communication signal through the regulation of said plurality of flashes of illumination as at least a portion of said at least one communication signal.

2. The combination of claim, 1 said at least one optical transceiver location identifier comprising global positioning system (GPS) location information.

3. The combination of claim 1, wherein the at least one optical transceiver is constructed and arranged to communicate with a thermostat.

4. The combination of claim 1, wherein the at least one optical transceiver is constructed and arranged to communicate with a video camera.

5. The combination of claim 1, wherein the at least one optical transceiver is constructed and arranged to communicate with a public address system.

6. The combination of claim 1, wherein the at least one optical transceiver is constructed and arranged to communicate with an alarm system.

7. The combination of claim 1, wherein said at least one optical transceiver is constructed and arranged to alter the appearance of light emitted from said at least one light emitting diode.

8. The combination of claim 7, further comprising a validator constructed and arranged to authorize generation of said at least one communication signal.

9. The combination of claim 8, further comprising sampling circuitry and a discriminator.

10. The combination of claim 9, wherein said processor is constructed and arranged to permit access to a space or device.

11. In combination, an LED light and communication system in communication with a broadband over power line communications system, the LED light and communication system comprising:

at least one optical transceiver comprising at least one optical transceiver location identifier, said at least one optical transceiver being in communication with said broadband over power line communications system for receipt of at least one broadband over power line communication signal, the at least one optical transceiver further comprising:

at least one light emitting diode and at least one photodetector attached thereto, said at least one light emitting diode generating light as illumination, said illumination comprising a plurality of flashes of illumination, said flashes of illumination not being observable to the unaided eyes of an individual; and a processor in communication with the at least one light emitting diode and the at least one photodetector, the processor constructed and arranged to regulate said plurality of flashes of illumination into at least one communication signal, said at least one communication signal comprising said at least one optical transceiver location identifier.

12. The combination of claim 11, wherein said processor is constructed and arranged to receive said at least one broadband over power line communication signal and to include said at least one broadband over power line communication signal into at least a portion of said at least one communication signal.

13. The combination of claim 11, the at least one optical transceiver location identifier comprising global positioning system (GPS) location information.

14. The combination of claim 11, further comprising a second optical transceiver separated a distance from said at least one optical transceiver, said second optical transceiver comprising:

at least one second optical transceiver location identifier;

at least one second light emitting diode and at least one second photodetector attached to said second optical transceiver, said at least one second light emitting diode generating a second communication signal comprising a plurality of flashes of light, said flashes of light not being observable to the unaided eyes of an individual; and a second processor in communication with the at least one second light emitting diode and the at least one second photodetector, the second processor constructed and arranged to regulate said plurality of flashes of light into said second communication signal, said second communication signal comprising said second optical transceiver location identifier.

15. The combination of claim 14, wherein said second optical transceiver is not in direct communication with said broadband over power line communications system, said second optical transceiver being constructed and arranged to receive from said at least one optical transceiver said at least one communication signal, and said second optical transceiver being further constructed and arranged to transmit to said at least one optical said at least one communication signal.

16. The combination of claim 11, the at least one communication signal further comprising a destination optical transceiver location identifier.

17. The combination of claim 16, said destination optical transceiver location identifier comprising GPS location information for said destination optical transceiver.

18. The combination of claim 17, further comprising an intermediate optical transceiver comprising at least one intermediate optical transceiver location identifier, and wherein the at least one communication signal includes the intermediate optical transceiver location identifier.

19. In combination, an LED light and communication system in communication with a broadband over power line communication system, the LED light and communication system comprising:

at least one optical transceiver comprising at least one optical transceiver location identifier, said at least one optical transceiver being in communication with said broadband over power line communication system for receipt of at least one broadband over power line communication signal, the at least one optical transceiver further comprising:

at least one light emitting diode and at least one photodetector attached thereto, said at least one light emitting diode generating light as illumination, said illumination comprising a plurality of flashes of illumination, said flashes of illumination not being observable to the unaided eyes of an individual;

a processor in communication with the at least one light emitting diode and the at least one photodetector, the processor constructed and arranged to regulate said plurality of flashes of illumination into at least one communication signal, said at least one communication signal comprising said at least one optical transceiver location identifier;

a second optical transceiver separated a distance from said at least one optical transceiver, said second optical transceiver comprising:

at least one second optical transceiver location identifier;

at least one second light emitting diode and at least one second photodetector attached to said second optical transceiver, said at least one second light emitting diode generating a second communication signal comprising a plurality of flashes of light, said flashes of light not being observable to the unaided eyes of an individual; and a second processor in communication with the at least one second light emitting diode and the at least one second photodetector, the second processor constructed and arranged to regulate said plurality of flashes of light into said second communication signal, said second communication signal comprising said second optical transceiver location identifier.

20. The combination of claim 19, wherein said second optical transceiver is not in direct communication with said broadband over power line communications system, said second optical transceiver being constructed and arranged to receive from said at least one optical transceiver said at least one communication signal, and said second optical transceiver being further constructed and arranged to transmit said at least one communication signal.

21. In combination, an LED light and communication system in communication with a broadband over power line communication system, the LED light and communication system comprising:

at least one optical transceiver comprising at least one optical transceiver location identifier, said at least one optical transceiver being in communication with said broadband over power line communication system for receipt of at least one broadband over power line communication signal, the at least one optical transceiver further comprising:

at least one light emitting diode and at least one photodetector attached thereto, said at least one light emitting diode generating light as illumination, said illumination comprising a plurality of flashes of illumination, said flashes of illumination not being observable to the unaided eyes of an individual;

a processor in communication with the at least one light emitting diode and the at least one photodetector, the processor constructed and arranged to regulate said plurality of flashes of illumination into at least one communication signal, said at least one communication signal comprising said at least one optical transceiver location identifier;

a destination optical transceiver comprising a destination optical transceiver location identifier, said destination optical transceiver location identifier comprising GPS location information for said destination optical transceiver; and an intermediate optical transceiver comprising at least one intermediate optical transceiver location identifier, and wherein the at least one communication signal includes the intermediate optical transceiver location identifier.

* * * * *